United States Patent
Arnold et al.

(10) Patent No.: US 12,355,235 B2
(45) Date of Patent: Jul. 8, 2025

(54) PROCESS CONTROL INSTRUMENTS HAVING LOCAL INTRINSIC SAFETY BARRIERS AND METHODS OF MANUFACTURING THE SAME

(71) Applicant: Fisher Controls International LLC, Marshalltown, IA (US)

(72) Inventors: Chris Arnold, Grinnell, IA (US); Gregory R. Bulleit, Des Moines, IA (US); Davin Nicholas, Bondurant, IA (US); Adam Wittkop, Marshalltown, IA (US); Marwan Saputera Brama, Singapore (SG); Stephen G. Seberger, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 211 days.

(21) Appl. No.: 18/176,322

(22) Filed: Feb. 28, 2023

(65) Prior Publication Data

US 2024/0291268 A1 Aug. 29, 2024

(51) Int. Cl.
*H02H 9/00* (2006.01)
*H02H 9/02* (2006.01)
*H02H 9/04* (2006.01)
*F16K 37/00* (2006.01)

(52) U.S. Cl.
CPC .............. *H02H 9/008* (2013.01); *H02H 9/02* (2013.01); *H02H 9/046* (2013.01); *F16K 37/0066* (2013.01)

(58) Field of Classification Search
CPC .......... H02H 9/008; H02H 9/02; H02H 9/046
See application file for complete search history.

(56) References Cited

U.S. PATENT DOCUMENTS

| | | | | |
|---|---|---|---|---|
| 2007/0183108 A1* | 8/2007 | Uhlenberg | ............. | H02H 9/008 361/91.1 |
| 2012/0300420 A1* | 11/2012 | Muldowney | .......... | G01F 15/063 361/752 |
| 2016/0248241 A1* | 8/2016 | Kancel | ................... | H02H 9/043 |
| 2017/0142840 A1* | 5/2017 | Surinya | ................ | H05K 5/0086 |
| 2018/0209833 A1* | 7/2018 | Haynes | .................... | B08B 3/08 |
| 2020/0196122 A1* | 6/2020 | Junk | ..................... | H04L 9/3213 |
| 2024/0053728 A1* | 2/2024 | Jung | ................. | G05B 19/4155 |

OTHER PUBLICATIONS

Emerson, "Fisher FIELDVUE DVC6200 Digital Valve Controller," Instruction Manual, Apr. 2022, 108 pages.
Emerson, "Fisher FIELDVUE DVC2000 Digital Valve Controller," Product Bulletin, Jun. 2020, 8 pages.

* cited by examiner

*Primary Examiner* — Scott Bauer
(74) *Attorney, Agent, or Firm* — HANLEY, FLIGHT & ZIMMERMAN, LLC

(57) ABSTRACT

Process control instruments having local intrinsic safety barriers and methods of manufacturing the same are disclosed. An example field instrument for a process control assembly includes a non-protection compartment, intrinsically safe circuitry positioned in the non-protection compartment, a protection compartment, non-intrinsically safe circuitry positioned in the protection compartment, and local barrier circuitry positioned in the protection compartment to operatively couple the non-intrinsically safe circuitry to the intrinsically safe circuitry, the local barrier circuitry to prevent the intrinsically safe circuitry from receiving an electrical energy that is greater than an electrical energy threshold from the non-intrinsically safe circuitry.

20 Claims, 15 Drawing Sheets

PROCESS CONTROL INSTRUMENTS HAVING LOCAL INTRINSIC SAFETY BARRIERS AND METHODS OF MANUFACTURING THE SAME

FIELD OF THE DISCLOSURE

This disclosure relates generally to process control and, more particularly, to process control instruments having local intrinsic safety barriers and methods of manufacturing the same.

BACKGROUND

In process control plants, ambient air often includes a combustible media, such as dust, flammable gas, etc., that combusts in response to encountering an ignition source (e.g., a spark). Such a combustion is difficult to contain and can cause damage when encountered.

SUMMARY

An example field instrument for a process control assembly disclosed herein includes a non-protection compartment, intrinsically safe circuitry positioned in the non-protection compartment, a protection compartment, non-intrinsically safe circuitry positioned in the protection compartment, and local barrier circuitry positioned in the protection compartment to operatively couple the non-intrinsically safe circuitry to the intrinsically safe circuitry, the local barrier circuitry to prevent the intrinsically safe circuitry from receiving an electrical energy that is greater than an electrical energy threshold from the non-intrinsically safe circuitry.

An example apparatus disclosed herein includes a process control assembly, and a field instrument positioned local to the process control assembly, the field instrument including a non-protection compartment, intrinsically safe circuitry positioned in the non-protection compartment, a protection compartment, non-intrinsically safe circuitry positioned in the protection compartment, and local barrier circuitry positioned in the protection compartment to operatively couple the non-intrinsically safe circuitry to the intrinsically safe circuitry, the local barrier circuitry to prevent the intrinsically safe circuitry from receiving an electrical energy that is greater than an electrical energy threshold from the non-intrinsically safe circuitry.

BRIEF DESCRIPTION OF THE DRAWINGS

In general, the same reference numbers will be used throughout the drawing(s) and accompanying written description to refer to the same or like parts. The figures are not to scale.

Figure 1:
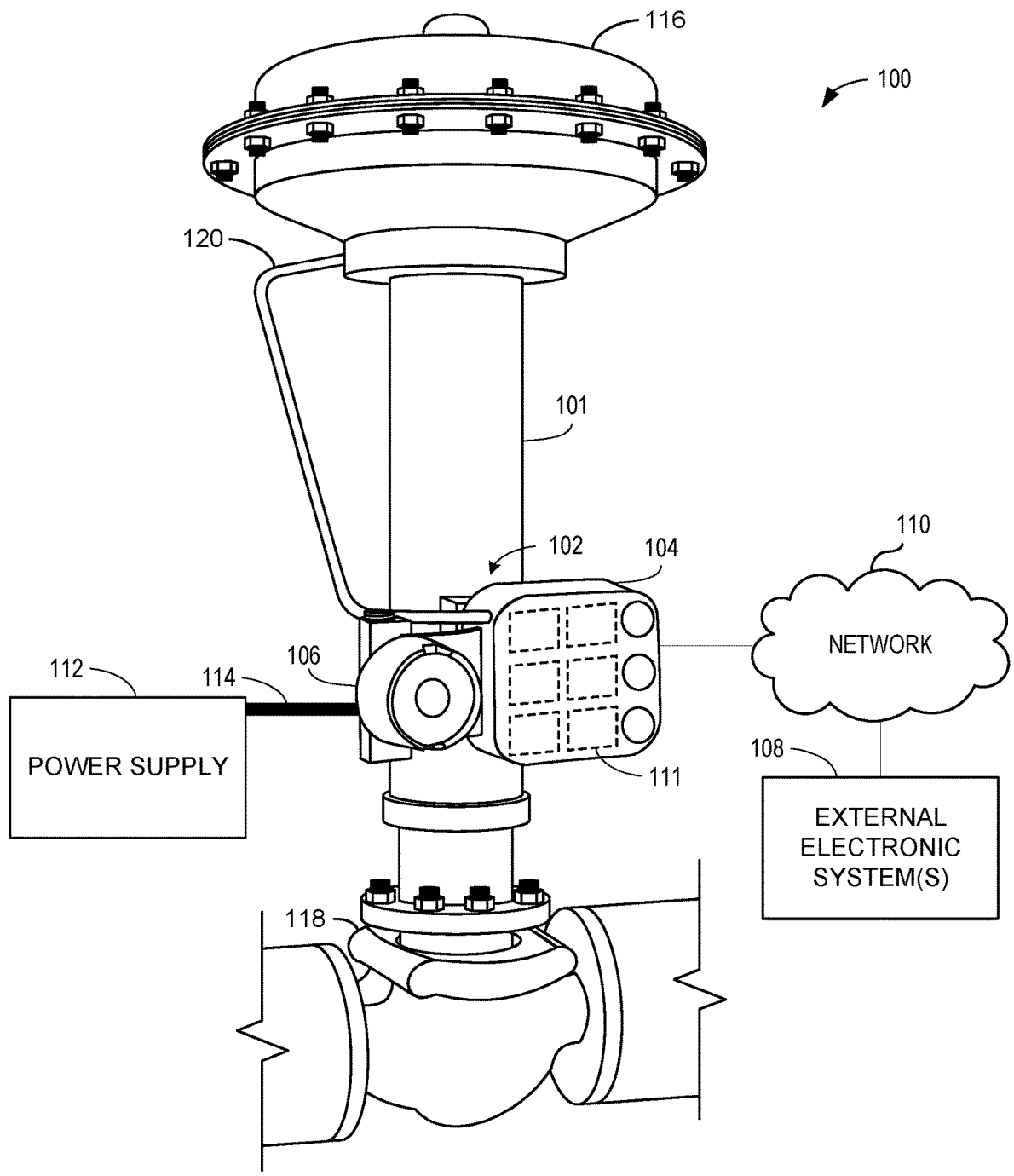
FIG. 1 illustrates an example process control system including an example process control assembly and an example instrument.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

As used herein, a threshold and/or a cut-off being "satisfied" encompasses conditions associated with the threshold and/or cut-off being met by a signal (e.g., a voltage, a current, etc.) to which the threshold and/or cut-off is compared. For example, an upper threshold or cut-off is "satisfied" in response to the signal in the comparison having a higher current than the upper threshold or cut-off current. Accordingly, a lower threshold or cut-off is "satisfied" in response to the signal in the comparison having a lower current than the lower threshold or cut-off.

As used herein, "non-intrinsically safe circuitry" encompasses electrical circuitry that is capable of producing, generating, and/or causing faults (e.g., an electrical signal having a parameter that exceeds the ratings of a component receiving the electrical signal) and, in turn, ignitions (e.g., fires, sparks, etc.). For example, the "non-intrinsically safe circuitry" can produce an excessively high voltage that exceeds the voltage rating of another component within or outside of the "non-intrinsically safe circuitry" thereby causing the component to ignite.

As used herein, "intrinsically safe circuitry" encompasses electrical circuitry that is not predisposed to producing faults. Accordingly, when a component of the "intrinsically safe circuitry" encounters a fault, the fault producing parameter (e.g., current that exceeds ratings of a component, voltage that exceeds ratings of a component, etc.) of the associated electrical signal originated from outside the "intrinsically safe circuitry." Specifically, the standard for "intrinsically safe circuitry" is based on a restriction of electrical energy within equipment and interconnecting wiring exposed to an explosive atmosphere to a level below which can cause ignition by either sparking or heating effects. Thus, "intrinsically safe circuitry" does not produce ignitions but for receiving an electrical signal from "non-intrinsically safe circuitry" outside the ratings of a component of the "intrinsically safe circuitry."

As used herein, a "protection compartment," "protection container," or "protection enclosure" encompasses a flameproof compartment or an increased safety compartment. For example, the "protection compartment" can have, or be capable of obtaining, Ex d Certification in accordance with International Electrotechnical Commission (IEC) 60079-0 (General Requirements) and IEC 60079-1 (Flameproof Enclosures). Alternatively, the "protection compartment" can have, or be capable of obtaining, Ex e Certification in accordance with IEC 60079-0 and IEC 60079-7 (Increased Safety). Further, the "protection compartment" can have, or be capable of obtaining Ex t Certification in accordance with IEC 60079-0 and 60079-31 (Dust Ignition Protection).

As used herein, "non-protection compartment," "simple compartment," "non-protection container," or "non-protection enclosure" encompasses compartments or enclosures other than flameproof compartments or increased safety compartments. Accordingly, a "non-protection compartment" does not have, or would be unable to obtain Ex d certification, Ex e certification, or Ex t certification.

Process control systems, like those used in chemical, petroleum, or other processes, may include a fluid flow control assembly to adjust flow settings (e.g., a flow rate, a fluid or mixture density, a pressure, etc.) associated with the process control system. Process control systems typically include at least one controller with associated inputs and outputs, which allow the controller(s) to acquire signals from various input devices and control various output devices. Such controllers may be used to monitor for potential failures of a field device during operation. Mitigation and/or prevention of such failures during operation are desirable to avoid the creation of hazardous operating conditions to process control system equipment and personnel.

In known process control systems, process control equipment capable of causing such failures (referred to herein as "non-intrinsically safe"), is kept in a separate room or environment isolated from the rest of the process control assembly such that, if the equipment faults, the media surrounding any ignition is not flammable and, thus, does not propagate the ignition. In some instances, to enable the circuitry to remain local to (e.g., attached to) the process control assembly, the circuitry is encapsulated by protection containers capable of reducing the probability of ignition of hazardous media present in the external environment. In such instances, the protection containers also encapsulate intrinsically safe circuitry with which the non-intrinsically safe circuitry exchanges electronic signals because a fault in the non-intrinsically safe circuitry would result in a signal that exceeds the ratings of the intrinsically safe circuitry and, in turn, cause an ignition therein that would otherwise propagate to the external environment. Thus, such protection containers are often large enough to encapsulate both the intrinsically safe and the non-intrinsically safe circuitry of the electronic instrument associated with the process control assembly.

Furthermore, to be capable of reducing the probability of ignition of hazardous media present in the external environment, such protection containers adhere to strict requirements, which can be found in IEC 60079-0 (General Requirements), IEC 60079-1 (Flameproof Enclosures), and IEC 60079-7 (Increased Safety), and obtain Ex d Certification or Ex e Certification. For instance, such protection containers must have a significant thickness to withstand high pressures and any joints or fasteners must be capable of preventing the ignition from escaping the enclosure. However, enclosures that are able to meet requirements associated with obtaining Ex d Certification, Ex e Certification, or Ex t Certification present difficulties for operators that interact with the equipment to manage process control operations. For instance, such protection containers do not allow transmission of certain signals that would allow a user to control the equipment from an external device. Additionally, providing a user interface through such protection containers is exceedingly difficult to design, costly, and less operator-friendly. For example, such protection containers require explosion proof glass and an optical reader within the enclosure to pick up the location of a finger of an operator in determining the process control information that the operator wishes to access or adjust.

Examples disclosed herein include barrier circuitry that safely couples intrinsically safe circuitry and non-intrinsically safe circuitry. Specifically, the barrier circuitry prevents a fault that is produced or encountered by the non-intrinsically safe circuitry from reaching the intrinsically safe circuitry. The barrier circuitry enables both the intrinsically safe circuitry and the non-intrinsically safe circuitry to be positioned outside of a designated safety environment and local to (e.g., attached to) a process control assembly. For example, the non-intrinsically safe circuitry and the barrier circuitry can be positioned in a protection compartment that is within a compartment (e.g., a non-protection compartment) that contains the intrinsically safe circuitry. Furthermore, the intrinsically safe circuitry can contain user interface circuitry, such as a touchscreen or a transceiver (e.g., a Bluetooth transceiver) that enables signals and, in turn, information to be exchanged with an external device (e.g., an electronic device associated with an operator).

Turning to the figures, FIG. 1 illustrates an example process control system 100 including an example process control assembly 101 and an example field instrument 102 coupled directly to the process control assembly 101. In the illustrated example of FIG. 1, the instrument 102 includes circuitry housed in a non-protection compartment 104 and a protection compartment 106. For example, the protection compartment 106 can have an Ex d flameproof certification in accordance with the requirements of EN/IEC 60079-0 (General Requirements) and EN/IEC 60079-1 (Flameproof Enclosures) and prevents an ignition therein from propagating outside the flameproof compartment 106. Additionally or alternatively, the protection compartment 106 can have Ex e increased safety certification in accordance with EN/IEC 60079-0 (General Requirements) and IEC 60079-7 (Increased Safety) and contains electrical equipment within explosive gas atmospheres. Additionally or alternatively, the protection compartment 106 can have Ex t dust ignition protection certification in accordance with EN/IEC 60079-0 (General Requirements) and EN/IEC 60079-31 (Dust Ignition Protection).

In examples disclosed herein, the protection compartment 106 houses non-intrinsically safe circuitry and local barrier circuitry. The local barrier circuitry couples the non-intrinsically safe circuitry to intrinsically safe circuitry housed in the non-protection compartment 104, as discussed in further detail below. In some examples, the intrinsically safe circuitry is communicatively coupled to one or more example external electronic system(s) 108 via an example network 110 (e.g., an industrial communication network).

In some examples, the instrument 102 is mechanically coupled to the process control assembly 101. For example, the instrument 102 can be coupled to the process control assembly 101 via mechanical fasteners, welding, brazing, etc. In the illustrated example of FIG. 1, the process control system 100 includes a power supply 112 that is electrically coupled to the non-intrinsically safe circuitry in the protection compartment 106. Further, the process control system 100 includes a protection conduit 114 (e.g., a flameproof conduit, an increased safety conduit, etc.) that extends from the power supply 112 to the protection compartment 106 to protect an electrical coupling (e.g., a wire(s)) that connects the power supply 112 to the non-intrinsically safe circuitry and relays power thereto. In the illustrated example of FIG. 1, the power supply 112 can be implemented by an industrial power source.

In the illustrated example of FIG. 1, the circuitry of the instrument 102 may be configured to perform one or more process control routines or functions that have been downloaded to and/or instantiated in the circuitry. For example, the circuitry of the instrument 102 can control, measure, and/or monitor one or more process control operation(s) associated with the process control assembly 101. In some examples, the instrument 102 controls, measures, and/or monitors the one or more process control operation(s) based on data (e.g., control commands, control signals, etc.). In such examples, the data can be formatted according to an industrial communication protocol and communicated to and/or from the instrument 102 over the network 110. In some examples, the industrial communication protocol is a highway addressable remote transducer (HART) communication protocol, a PROFIBUS communication protocol, a FOUNDATION Fieldbus communication protocol, or a MODBUS communication protocol. Alternatively, any other industrial communication protocol may be used.

To enable the non-intrinsically safe circuitry of the instrument 102 to be positioned local to the process control assembly 101 in a hazardous environment (e.g., outside of a designated hazard protection environment), the local barrier circuitry limits an electrical energy (e.g., an electrical power, a voltage, a current, etc.) of electrical signals that exit the protection compartment 106 (e.g., that the non-intrinsically safe circuitry transmits to the intrinsically safe circuitry), as discussed in further detail below. As such, when a signal from the non-intrinsically safe circuitry has an electrical energy that that exceeds the safety ratings of a component(s) of the intrinsically safe circuitry, the local barrier circuitry halts the signal or reduces the electrical energy of the signal before the signal exits the protection compartment 106 and reaches the intrinsically safe circuitry. Thus, the local barrier circuitry prevents the intrinsically safe circuitry from encountering an ignition in the non-protection compartment 104 that would otherwise propagate to the external environment as a result of combustible media proximate to the non-protection compartment 104. Advantageously, such protection enables the intrinsically safe circuitry to be positioned in the non-protection compartment 104 as opposed to the protection compartment 106. Moreover, the non-protection compartment 104 enables passage of signals, such as Bluetooth signals, between the external electronic system(s) 108 and the intrinsically safe circuitry. Additionally, the non-protection compartment 104 enables the intrinsically safe circuitry to include user interface circuitry 111 operable local to the process control assembly 101 to enable an operator to control and/or observe operations (e.g., provide inputs, observe outputs, etc.) of the process control assembly 101 locally at the instrument 102. As a result, an operator can more easily interact with the instrument 102 to control and/or monitor an operation of the process control assembly 101. In some examples, the user interface circuitry 111 defines and/or is positioned against a surface of the non-protection compartment 104.

In some examples, the process control assembly 101 is a pneumatically actuated valve assembly that includes an example actuator 116, an example valve 118, and an example pneumatic connection 120. Alternatively, the process control assembly 101 may be any other type of process control related assembly (e.g., an electrically actuated valve assembly, a hydraulically actuated valve assembly, a motor, a pump, etc.). In the illustrated example of FIG. 1, the pneumatic connection 120 operatively couples the instrument 102 to the actuator 116. In some examples, the intrinsically safe circuitry of the instrument 102 housed in the non-protection compartment 104 includes a combination of pressure gauges, logic circuits, processors, transmitters, etc. In some examples, the instrument 102 receives an input (e.g., a current measurement, a voltage measurement, etc.) corresponding to a state (e.g., a safe state, a failure state, a low flow state, a high flow state, etc.) of the process control system 100. For example, the instrument 102 can receive the input from the external electronic system(s) 108 (e.g., one or more programmable logic controllers, one or more computers, etc.) in communication with the network 110. In some examples, the instrument 102 compares the input to one or more thresholds (e.g., current thresholds, trip currents, voltage thresholds, etc.) and determines a process control operation (e.g., a valve position adjustment) to be implemented. Further, the intrinsically safe circuitry of the instrument 102 can include current-pressure (I/P) transducer circuitry operatively coupled to the pneumatic connection 120 to relay a signal indicative of the determined process control operation to the actuator 116. Accordingly, the actuator 116 can actuate the valve 118 based on the signal to implement the corresponding process control adjustment.

Figure 2:
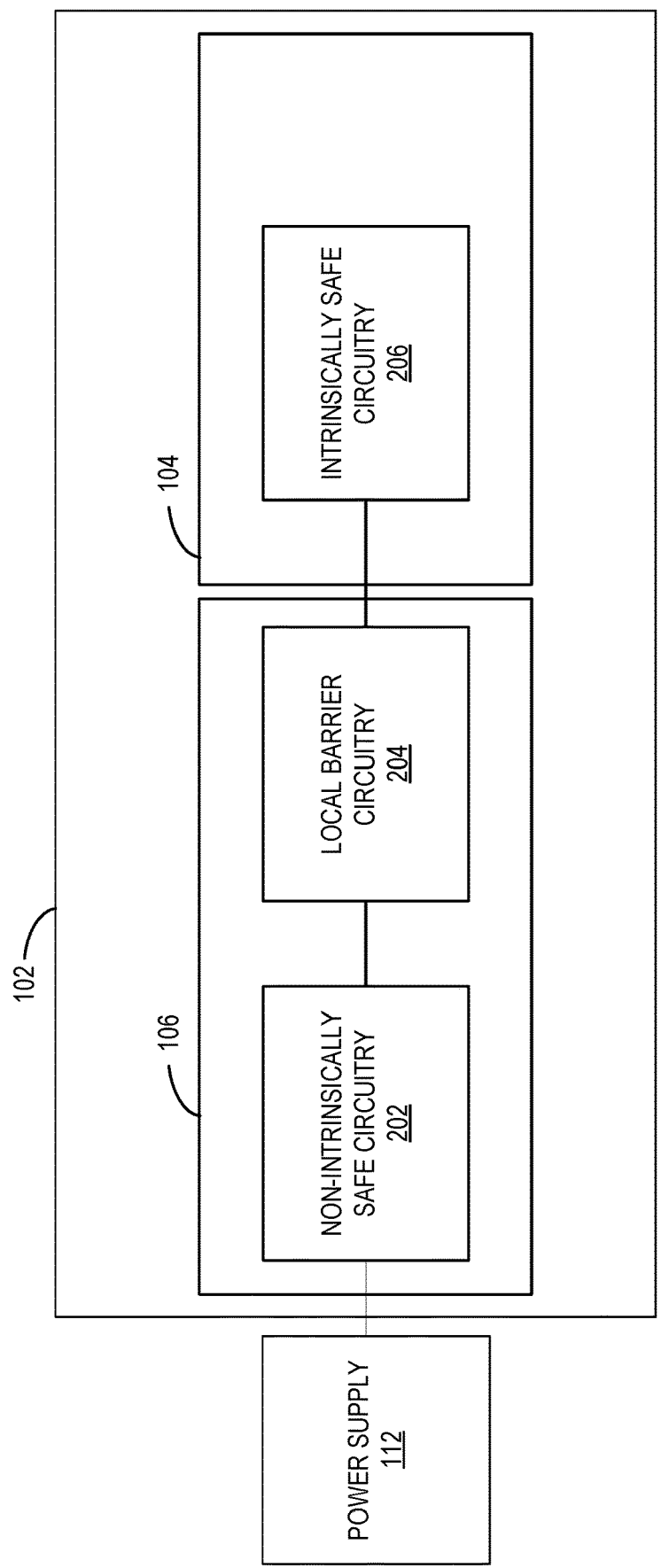
FIG. 2 is a block diagram of the example instrument of FIG. 1 including example barrier circuitry to couple example non-intrinsically safe circuitry to example intrinsically safe circuitry.

FIG. 2 is a block diagram of the example field instrument 102 of FIG. 1 including example non-intrinsically safe circuitry 202 coupled to the power supply 112 and example local barrier circuitry 204 to couple the non-intrinsically safe circuitry 202 to example intrinsically safe circuitry 206. The non-intrinsically safe circuitry 202 and the local barrier circuitry 204 are positioned in the protection compartment 106, and the intrinsically safe circuitry 206 is positioned in the non-protection compartment 104. In the illustrated example of FIG. 2, the instrument 102 is powered by the power supply 112. Specifically, the non-intrinsically safe circuitry 202 receives the power from the power supply 112, and the local barrier circuitry 204 relays the power from the non-intrinsically safe circuitry 202 to the intrinsically safe circuitry 206.

Figure 3A:
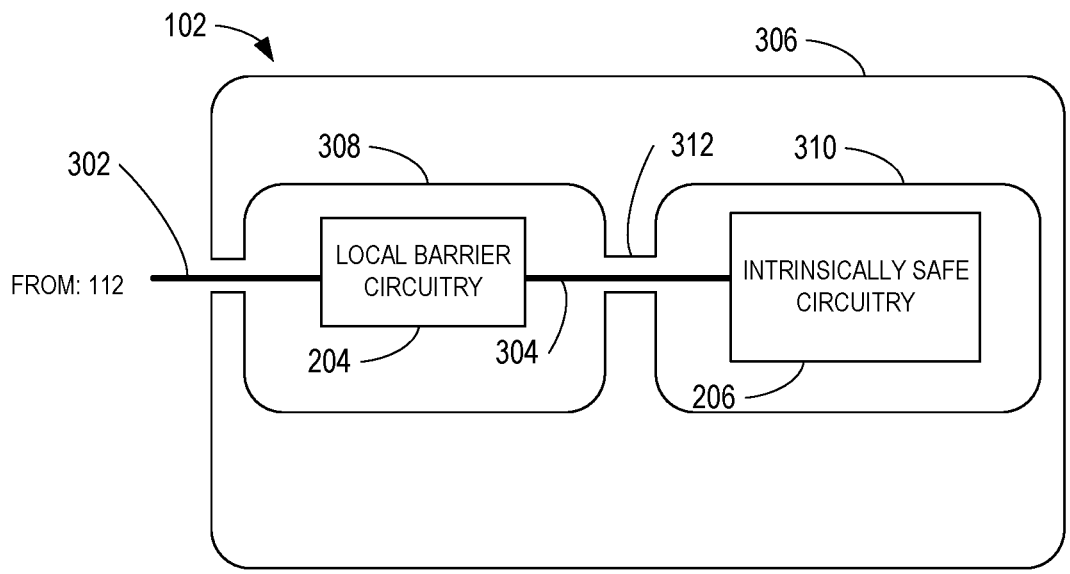
FIGS. 3A-3C illustrate example layouts of the example barrier circuitry, the example non-intrinsically safe circuitry, and the example intrinsically safe circuitry in the instrument of FIGS. 1-2.
Figure 3B:
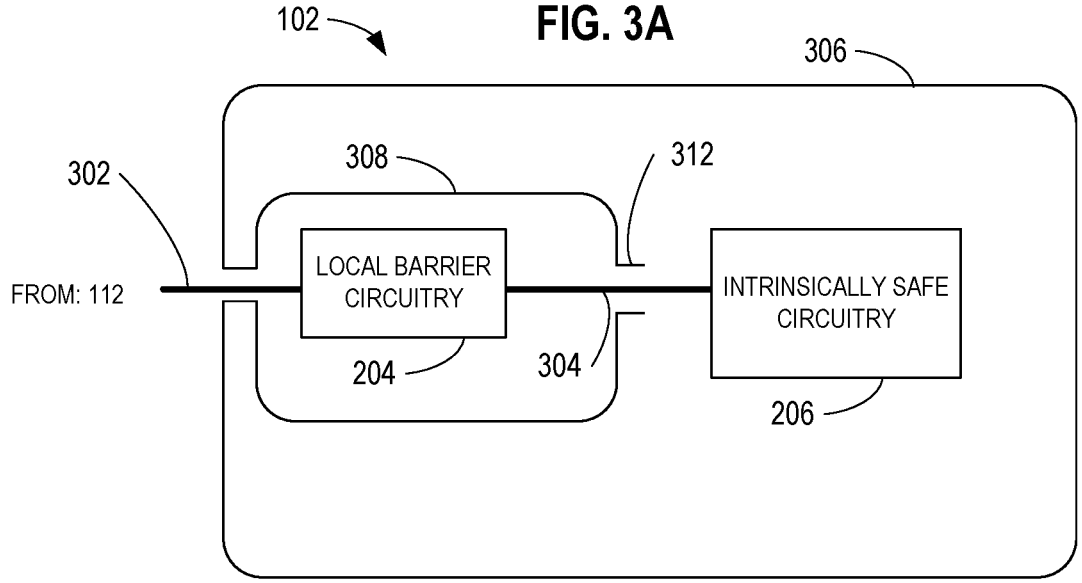
Figure 3C:
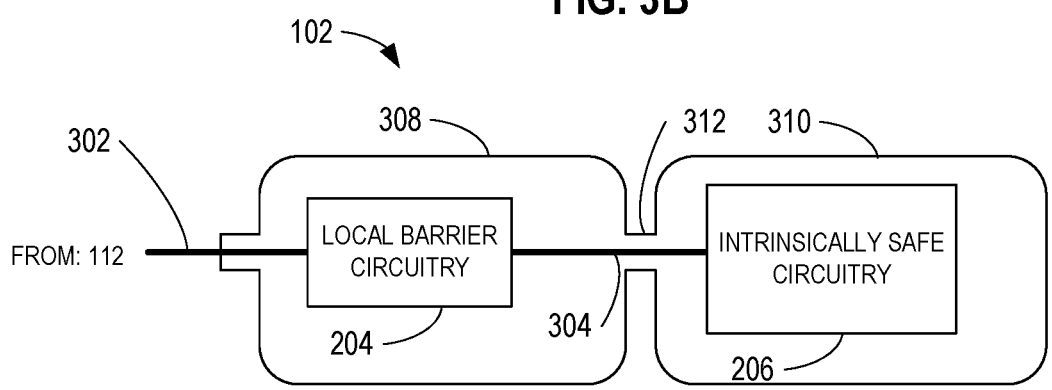

FIGS. 3A-3C illustrate example layouts of the local barrier circuitry 204 and the intrinsically safe circuitry 206 of the field instrument 102 of FIG. 2. In the illustrated examples of FIGS. 3A-3C, the barrier circuitry 204 receives a non-intrinsically safe electrical signal from the non-intrinsically safe circuitry 202 and/or the power supply 112. For example, the non-intrinsically safe electrical signal can include a voltage of up to 250 Volts (V) and/or a current of up to 1.5 kiloamperes (kA). In example operation, when the non-intrinsically safe electrical signal has a current that satisfies (e.g., is greater than, is greater than or equal to) a signal threshold or cut-off (e.g., a voltage threshold, a current threshold, a power threshold, etc.) associated with the rating of one or more components in the intrinsically safe circuitry 206, the barrier circuitry 204 modifies the electrical energy of the signal, as discussed in further detail below. Otherwise, the local barrier circuitry 204 enables the signal to pass to the intrinsically safe circuitry 206 without modification. That is, the local barrier circuitry 204 limits the electrical energy that can be delivered to the intrinsically safe circuitry 206 to prevent the signal from damaging components in the intrinsically safe circuitry 206 and/or causing an ignition that would otherwise propagate outside the instrument 102 and spread via the flammable media in the surrounding environment.

In the illustrated examples of FIGS. 3A-3C, the instrument 102 includes first electrical couplings 302 (e.g., wires, cables, etc.) to carry electrical signals to the local barrier circuitry 204. Further, the instrument 102 includes second electrical couplings 304 (e.g., wires, cables, printed circuit board (PCB) connections, etc.) to carry electrical signals from the local barrier circuitry 204 to the intrinsically safe circuitry 206. Although the illustrated examples of FIGS. 3A-3C do not depict the non-intrinsically safe circuitry 202, it should be understood that the non-intrinsically safe circuitry 202 may be in connection with the first electrical coupling 302 and positioned in the same compartment as the local barrier circuitry 204. Additionally or alternatively, the non-intrinsically safe circuitry 202 may only include electrical couplings (e.g., wires, cables, etc.) that relay high-power electrical signals (e.g., signals carrying 250 V and/or 1.5 kA).

FIG. 3A illustrates a first example configuration of the field instrument 102 of FIGS. 1-2. In the illustrated example of FIG. 3A, the field instrument 102 includes a first outer compartment 306 (e.g., a first non-protection compartment). Further, the field instrument 102 includes a protection compartment 308 and a second outer compartment 310 (e.g., a second non-protection compartment, the non-protection compartment 104 of FIGS. 1 and 2) positioned in the first simple compartment 306. In the illustrated example of FIG. 3A, the local barrier circuitry 204 is positioned in the increased safety or protection compartment 308, and the intrinsically safe circuitry 206 is positioned in the second outer compartment 310. Further, the second electrical coupling 304 extends from the increased safety or protection compartment 308 to the second simple compartment 310 to convey an intrinsically safe electrical signal (e.g., an intrinsically safe electrical power) from the local barrier circuitry 204 to the intrinsically safe circuitry 206. The field instrument 102 also includes a joint or gland 312 positioned around the second electrical couplings 304 at an exit of the increased safety or protection compartment 308. When the protection compartment 308 is an increased safety compartment, the joint or gland 312 is an increased safety cable gland. When the protection compartment 308 is a flameproof compartment, the joint or gland 312 is a flameproof joint.

FIG. 3B illustrates a second example configuration of the field instrument 102 of FIGS. 1-2. In the illustrated example of FIG. 3B, the field instrument 102 includes the first outer compartment 306 and the protection compartment 308. In the illustrated example of FIG. 3B, the local barrier circuitry 204 is positioned in the protection compartment 308, and the intrinsically safe circuitry 206 is positioned in the first outer compartment 310. The second electrical coupling 304 extends through the joint or gland 312 out of the protection compartment 308 through the joint or gland 312 to convey the intrinsically safe electrical signal to the intrinsically safe circuitry 206.

FIG. 3C illustrates a third example configuration of the field instrument 102 of FIG. 102. In the illustrated example of FIG. 3C, the field instrument 102 includes the protection compartment 308 and the second outer compartment 310. In the illustrated example of FIG. 3C, the local barrier circuitry 204 is positioned in the protection compartment 308, and the intrinsically safe circuitry 206 is positioned in the second outer compartment 310. The second electrical coupling 304 extends through the joint or gland 312 from the protection compartment 308 to the second outer compartment 310 to convey the intrinsically safe electrical signal to the intrinsically safe circuitry 206.

Figure 4:
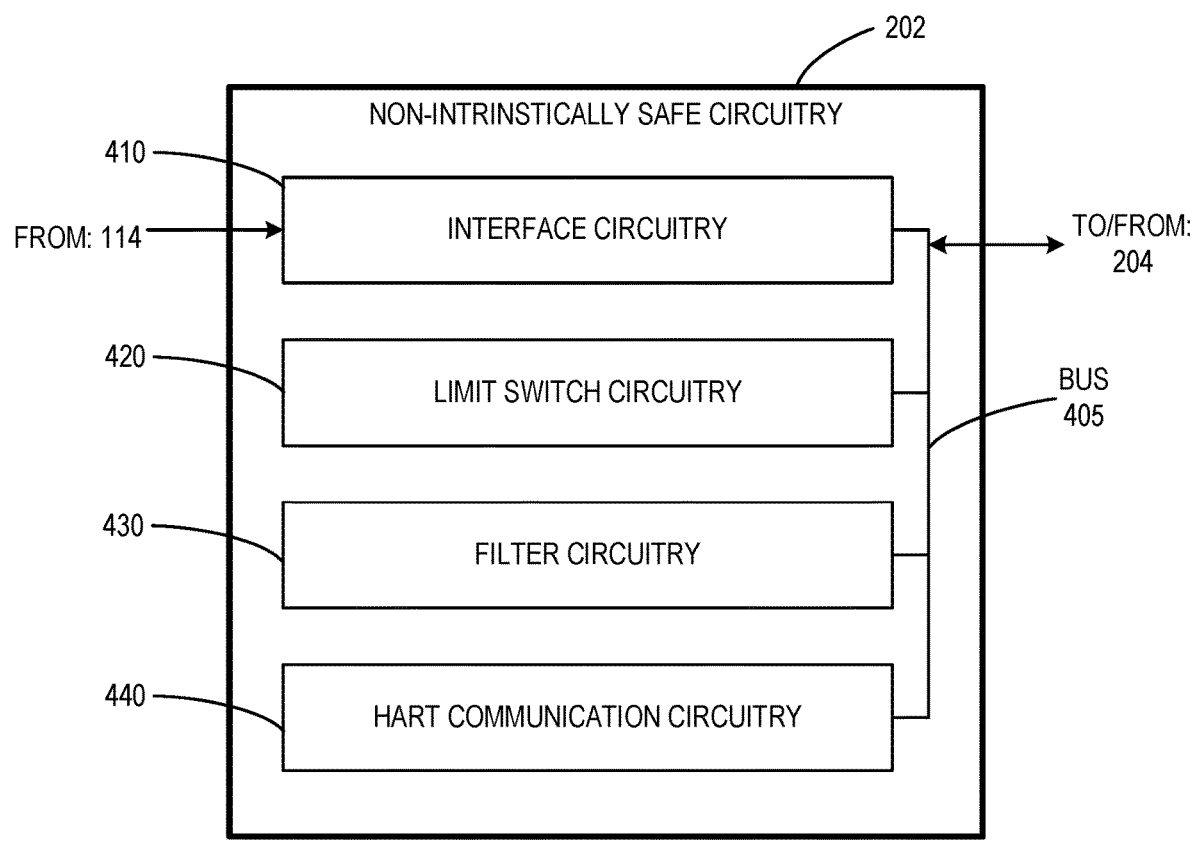
FIG. 4 is a block diagram of the example non-intrinsically safe circuitry of FIG. 2.

FIG. 4 is an example block diagram of the non-intrinsically safe circuitry 202 of FIG. 2 to manage process control operations associated with the process control assembly 101 of FIG. 1. The non-intrinsically safe circuitry 202 of FIG. 4 may be implemented using any combination of discrete active and/or passive circuitry, integrated circuits and/or instantiated (e.g., creating an instance of, bring into being for any length of time, materialize, implement, etc.) by processor circuitry such as a central processing unit executing instructions. Additionally or alternatively, the non-intrinsically safe circuitry 202 of FIG. 4 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by microprocessor circuitry executing instructions to implement one or more virtual machines and/or containers.

The non-intrinsically safe circuitry 202 of FIG. 2 includes a bus 405, first interface circuitry 410, limit switch circuitry 420, filter circuitry 430, and HART communication circuitry 440. The first interface circuitry 410, the limit switch circuitry 420, the filter circuitry 430, and the HART communication circuitry 440 are in communication with the bus 405. The bus 405 is also in communication with the local barrier circuitry 204. For example, the bus 405 can correspond to, be representative of, and/or otherwise implement at least one of a universal asynchronous receiver-transmitter (UART), a Controller Area Network (CAN bus), RS-485 connectors, an Inter-Integrated Circuit (I2C) bus, or a Serial Peripheral Interface (SPI) bus.

The non-intrinsically safe circuitry 202 of FIG. 2 includes the first interface circuitry 410 to receive and/or transmit electrical signals from and/or to the barrier circuitry 204. For example, the first interface circuitry 410 can correspond to, be representative of, and/or otherwise implement a transmitter and/or digital input/output (I/O) circuitry. Additionally, the interface circuitry 410 can receive electrical power from the power supply 114 of FIG. 1. In some examples, the communication is effectuated via an Ethernet connection, a digital subscriber line (DSL) connection, a telephone line connection, a coaxial cable system, a satellite system, a beyond line-of-site wireless system, a line-of-site wireless system, a cellular telephone system, etc. For example, the interface circuitry 410 can be implemented by any type of interface standard, such as a wireless fidelity (Wi-Fi) interface, an Ethernet interface, a universal serial bus (USB), a Bluetooth interface, a near field communication (NFC) interface, a UART, RS-485 circuitry, or CAN circuitry.

The non-intrinsically safe circuitry 202 of FIG. 2 includes the limit switch circuitry 420 to detect and/or limit physical movement of a component of the process control assembly 101 (e.g., the valve 120). The non-intrinsically safe circuitry 202 of FIG. 2 includes the filter circuitry 430 to prevent electromagnetic interference and/or power surges from interfering with signals transmitted to and/or from the non-intrinsically safe circuitry 202, as discussed in further detail in association with FIG. 9. The non-intrinsically safe circuitry 202 of FIG. 2 includes the HART communication circuitry 440 to transmit and/or receive digital signals overlaid on a 4-20 mA loop current. For example, the digital signal can be indicative of a first status associated with the process control system 100, and the 4-20 mA current can be indicative of a second status associated with the process control system 100.

Figure 5:
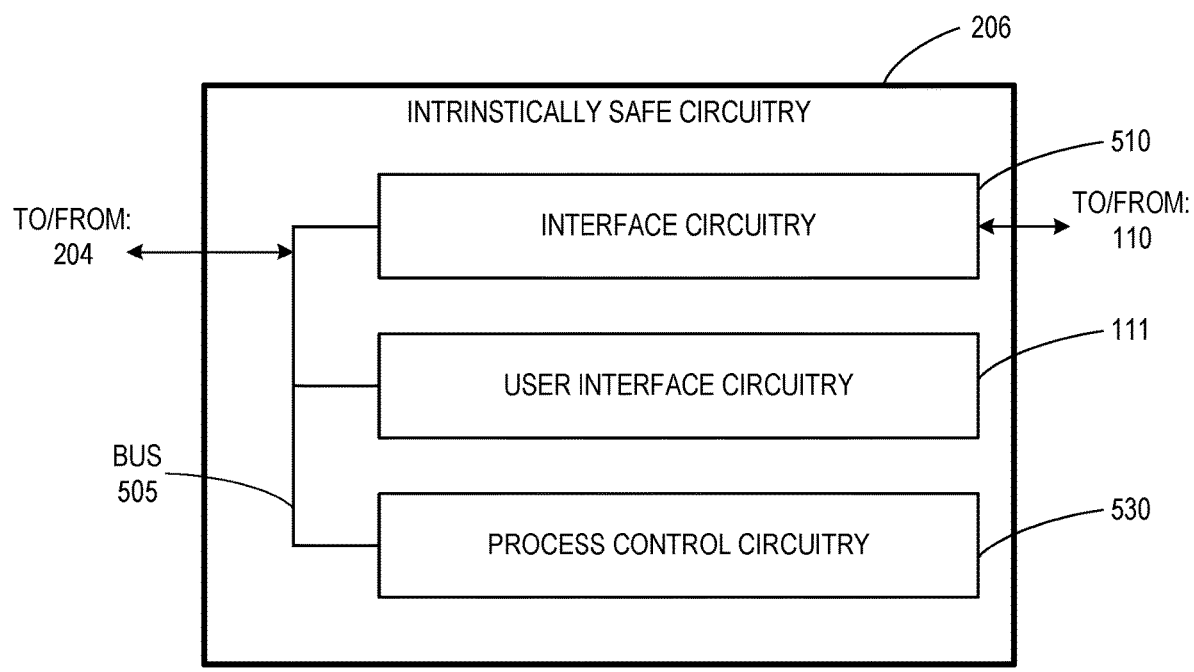
FIG. 5 is a block diagram of the example intrinsically safe circuitry of FIG. 2.

FIG. 5 is an example block diagram of the example intrinsically safe circuitry 206 of FIG. 2 to manage process control operations associated with the process control assembly 101 of FIG. 1. The intrinsically safe circuitry 206 of FIG. 5 may be implemented using any combination of discrete active and/or passive circuitry, integrated circuits and/or instantiated (e.g., creating an instance of, bring into being for any length of time, materialize, implement, etc.) by processor circuitry such as a central processing unit executing instructions. Additionally or alternatively, the intrinsically safe circuitry 206 of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by microprocessor circuitry executing instructions to implement one or more virtual machines and/or containers.

The example intrinsically safe circuitry 206 of FIG. 5 includes an example bus 505, example interface circuitry 510, the example user interface circuitry 111, and example process control circuitry 530. The interface circuitry 510, the user interface circuitry 111, and the process control circuitry 530 are in communication with the bus 505. Further, the bus 505 is in communication with the local barrier circuitry 204. For example, the bus 505 can correspond to, be representative of, and/or otherwise implement at least one of an I2C bus, a SPI bus, a UART, RS-485 circuitry, or CAN circuitry.

The example intrinsically safe circuitry 206 of FIG. 5 includes the interface circuitry 510 to receive and/or transmit electrical signals from and/or to the barrier circuitry 204. Additionally, the interface circuitry 510 can receive information communicated over the network 110 (e.g., from the external devices 108). In some examples, the communication is effectuated via an Ethernet connection, a DSL connection, a telephone line connection, a coaxial cable system, a satellite system, a beyond line-of-site wireless system, a line-of-site wireless system, a cellular telephone system, etc. For example, the interface circuitry 510 can be implemented by any type of interface standard, such as a Wi-Fi interface, an Ethernet interface, a USB, a Bluetooth interface, an NFC interface, a UART, RS-485 circuitry, or CAN circuitry.

The example intrinsically safe circuitry 206 of FIG. 5 includes the user interface circuitry 111 to enable a user (e.g., an operator) associated with the process control system 100 to interact with the process control assembly and/or the field instrument 102 locally. For example, the user interface circuitry 111 can include push buttons, a display, a touchscreen, and/or the like to enable the user to manage operations of the process control assembly 101.

The example intrinsically safe circuitry 206 of FIG. 5 includes the process control circuitry 530 to control an operation of the process control assembly 101. In some examples, the process control circuitry 530 controls a position of the valve 118 of FIG. 1. In such examples, the process control circuitry 530 includes I/P transducer circuitry to convert a signal to a pressure that the pneumatic connection 120 of FIG. 1 relays to the actuator 116. In some other examples, the process control circuitry 530 controls a different process control operation, such as operation of a motor, a pump, and/or any other operation.

Figure 6:
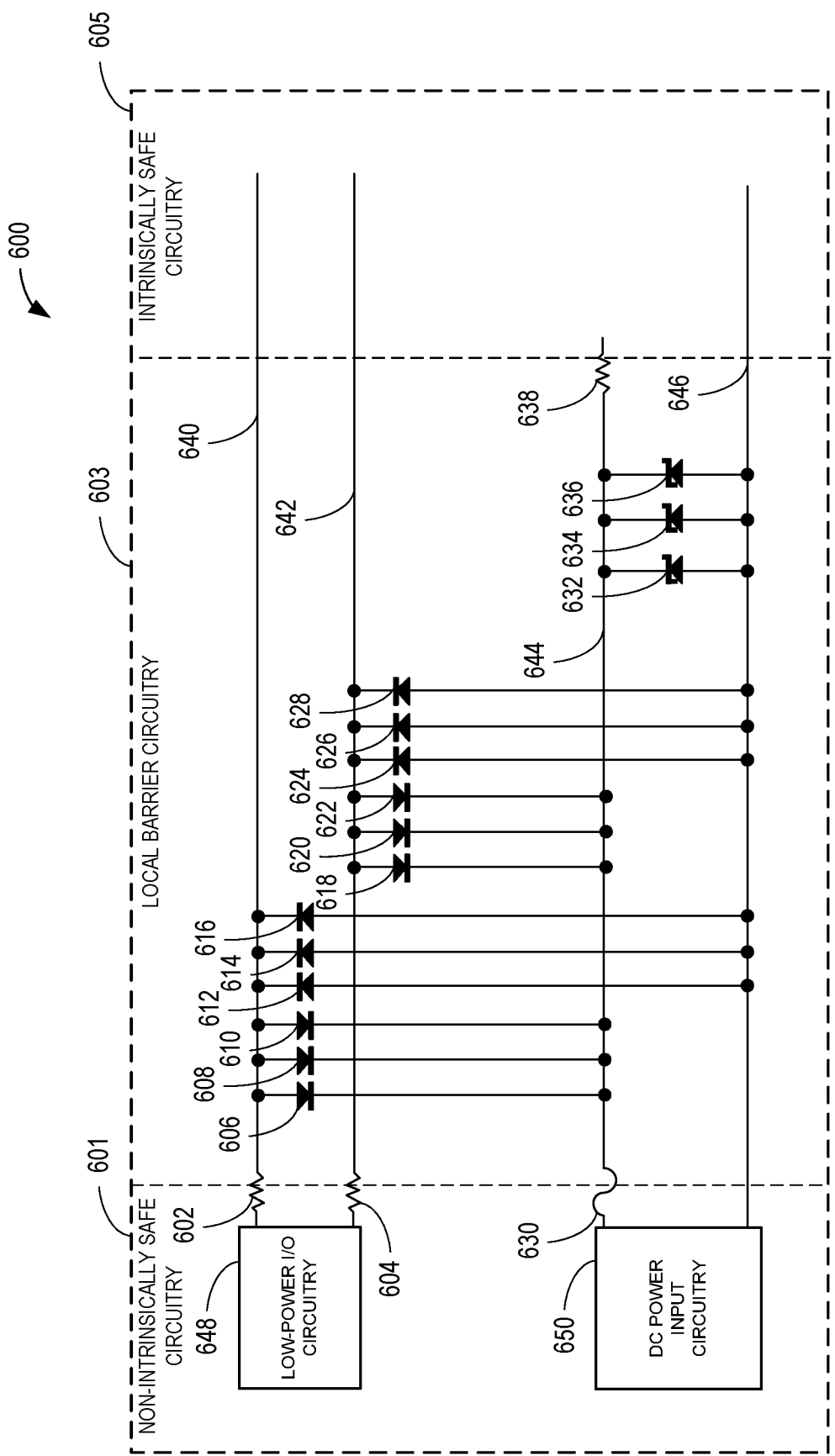
FIG. 6 is a schematic illustration of a first example implementation of the instrument of FIGS. 1, 2, and/or 3A-3C.

FIG. 6 is a schematic illustration representative of first example field instrument circuitry 600 including first example non-intrinsically safe circuitry 601, first example local barrier circuitry 603, and first example intrinsically safe circuitry 605. The first example field instrument 600 is representative of a first example implementation of the instrument 102 of FIGS. 1, 2, and/or 3A-C. The first example non-intrinsically safe circuitry 601 is an example implementation of at least a portion of the non-intrinsically safe circuitry 202 of FIGS. 2 and/or 4. The first example local barrier circuitry 603 is an example implementation of the local barrier circuitry 204 of FIGS. 2 and/or 3A-3C. The first example intrinsically safe circuitry 605 is an example implementation of at least a portion of the intrinsically safe circuitry 206 of FIGS. 2, 3A-3C, and/or 5.

In the illustrated example of FIG. 6, the instrument circuitry 600 includes a first example resistor 602, a second example resistor 604, a first example diode 606, a second example diode 608, a third example diode 610, a fourth example diode 612, a fifth example diode 614, a sixth example diode 616, a seventh example diode 618, an eighth example diode 620, a ninth example diode 622, a tenth example diode 624, an eleventh example diode 626, a twelfth example diode 628, an example fuse 630 (e.g., a low resistance fuse), a first example Zener diode 632, a second example Zener diode 634, a third example Zener diode 636, and a third example resistor 638. Further, the first example instrument circuitry 600 includes a first example electrical coupling 640 (e.g., a first wire, a first cable, a first PCB conductive trace, etc.), a second example electrical coupling 642 (e.g., a second wire, a second cable, a second PCB conductive trace, etc.), a third example electrical coupling 644 (e.g., a third wire, a third cable, a third PCB conductive trace, etc.), and a fourth example electrical coupling 646 (e.g., a fourth wire, a fourth cable, a fourth PCB conductive trace, etc.).

In the illustrated example of FIG. 6, the first, second, and fourth electrical couplings 640, 642, 646 connect the local barrier circuitry 204 and, in turn, the example non-intrinsically safe circuitry 601 (e.g., an example implementation of a portion of the non-intrinsically safe circuitry 202) to the example intrinsically safe circuitry 605 (e.g., an example implementation of a portion of the intrinsically safe circuitry 206). The third electrical coupling 644 connects components within the local barrier circuitry 204, as discussed in further detail below. In the illustrated example of FIG. 6, the non-intrinsically safe circuitry 601 includes low-power I/O circuitry 648 and direct current (DC) power input circuitry 650.

In the illustrated example of FIG. 6, a first terminal of the first resistor 602 is coupled to a first terminal of the low-power I/O circuitry 648. A second terminal of the first resistor 602 is coupled to the first electrical coupling 640. In the illustrated example of FIG. 6, a first terminal of the second resistor 604 is coupled to a second terminal of the low-power I/O circuitry 648. A second terminal of the second resistor 604 is coupled to the second electrical coupling 642. In the illustrated example of FIG. 6, first terminals (e.g., anodes) of the first, second, and third diodes 606, 608, 610 are coupled to the first electrical coupling 640, and second terminals (e.g., cathodes) of the first, second, and third diodes 606, 608, 610 are coupled to the third electrical coupling 644. In the illustrated example of FIG. 6, first terminals (e.g., anodes) of the fourth, fifth, and sixth diodes 612, 614, 616 are coupled to the fourth electrical coupling 646, and second terminals (e.g., cathodes) of the fourth, fifth, and sixth diodes 612, 614, 616 are coupled to the first electrical coupling 640. In the illustrated example of FIG. 6, first terminals (e.g., anodes) of the seventh, eighth, and ninth diodes 618, 620, 622 are coupled to the second electrical coupling 642, and second terminals (e.g., cathodes) of the seventh, eighth, and ninth diodes 618, 620, 622 are coupled to the third electrical coupling 644. In the illustrated example of FIG. 6, first terminals (e.g., anodes) of the tenth, eleventh, and twelfth diodes 624, 626, 628 are coupled to the fourth electrical coupling 646, and second terminals (e.g., cathodes) of the tenth, eleventh, and twelfth diodes 624, 626, 628 are coupled to the second electrical coupling 642.

In the illustrated example of FIG. 6, to minimize or otherwise reduce the amount of resistance in series with the high power draw from the DC power input circuitry 650, the fuse 630 is coupled to the DC power input circuitry 650 instead of a resistor. In the illustrated example of FIG. 6, a first terminal of the fuse 630 is coupled to a first terminal of the DC power input circuitry 650. A second terminal of the fuse 630 is coupled to the third electrical coupling 644. A second terminal of the DC power input circuitry 650 is coupled to the fourth electrical coupling 646. In the illustrated example of FIG. 6, first terminals (e.g., anodes) of the first, second, and third Zener diodes 632, 634, 636 are coupled to the fourth electrical coupling 646, and second terminals (e.g., cathodes) of the first, second, and third Zener diodes 632, 634, 636 are coupled to the third electrical coupling 644. In the illustrated example of FIG. 6, a first terminal of the third resistor 638 is coupled to the third electrical coupling 644, and a second terminal of the third resistor 638 is coupled to the intrinsically safe circuitry 206.

In example operation, the first, second, and third diodes 606, 608, 610 enable current to flow from the first electrical coupling 640 to the third electrical coupling 644 when the first electrical coupling 640 is at a higher electrical potential than the third electrical coupling 644. Additionally, the first, second, and third diodes 606, 608, 610 prevent current from the third electrical coupling 644 from flowing to the first electrical coupling 640 in normal operation (e.g., in the absence of a fault). In example operation, the fourth, fifth, and sixth diodes 612, 614, 616 enable current to flow from the fourth electrical coupling 646 to the first electrical coupling 640 when the first electrical coupling 640 is at a lower electrical potential than the fourth electrical coupling 646. Additionally, the fourth, fifth, and sixth diodes 612, 614, 616 prevent the current from flowing from the first electrical coupling 640 to the fourth electrical coupling 646 in normal operation. In example operation, the seventh, eighth, and ninth diodes 618, 620, 622 enable current to flow from the second electrical coupling 642 to the third electrical coupling 644. Further, the seventh, eighth, and ninth diodes 618, 620, 622 prevent current from flowing from the third electrical coupling 644 to the second electrical coupling 642. In example operation, the tenth, eleventh, and twelfth diodes 624, 626, 628 enable current to flow from the fourth electrical coupling 646 to the second electrical coupling 642 while preventing current from flowing from the second electrical coupling 642 to the fourth electrical coupling 646. Accordingly, the diodes 606, 608, 610, 612, 614, 616, 618, 620, 622, 624, 626, 628 enable current from the low-power I/O circuitry 648 to flow to the third electrical coupling 644 while preventing current from the low-power I/O circuitry 648 from flowing to the fourth electrical coupling 646.

In example operation, the first resistor 602 and the second resistor 604 reduce current flow to and/or from the first and second terminals of the low-power I/O circuitry 648. As a result, the first resistor 602 and the second resistor 604 limit the current flow and voltage encountered by the diodes 606, 608, 610, 612, 614, 616, 618, 620, 622, 624, 626, 628 to prevent the diodes 606, 608, 610, 612, 614, 616, 618, 620, 622, 624, 626, 628 from encountering electrical signals that exceed the ratings of the respective diodes 606, 608, 610, 612, 614, 616, 618, 620, 622, 624, 626, 628 and, thus, prevent the diodes 606, 608, 610, 612, 614, 616, 618, 620, 622, 624, 626, 628 from encountering a failure (e.g., overheating, short circuiting, etc.).

In example operation, the fuse 630 opens in response to encountering an electrical current that exceeds a current threshold. The first, second, and third Zener diodes 632, 634, 636 enable current to flow from the fourth electrical coupling 646 to the third electrical coupling 644 when the fourth electrical coupling 646 is at a higher electrical potential than the third electrical coupling 644. In example operation, the first, second, and third Zener diodes 632, 634, 636 enable current to flow from third electrical coupling 644 to the fourth electrical coupling 646 when the first, second, and/or third Zener diodes 632, 634, 636 encounter a voltage at the respective second terminals of the Zener diodes 632, 634, 636 in connection with the third electrical coupling 644 that satisfies (e.g., is greater than, is greater than or equal to) a voltage threshold (e.g., the Zener voltage). In such example operations, the first, second, and/or third Zener diodes 632, 634, 636 limit the voltage across the respective Zener diode 632, 634, 636. As a result, the Zener diodes 632, 634, 636 prevent an excessive voltage from being delivered to the intrinsically safe circuitry 206. In some examples, the third resistor 638 limits the electrical energy delivered to the intrinsically safe circuitry 206 when the voltage carried by the third electrical coupling 644 does not satisfy the voltage threshold. As a result, the local barrier circuitry 204 limits the current flow and/or voltage that can propagate from the non-intrinsically safe circuitry 202 to the intrinsically safe circuitry 206 to avoid damage to components therein that would otherwise cause an ignition outside of the protection compartment 106.

Figure 7:
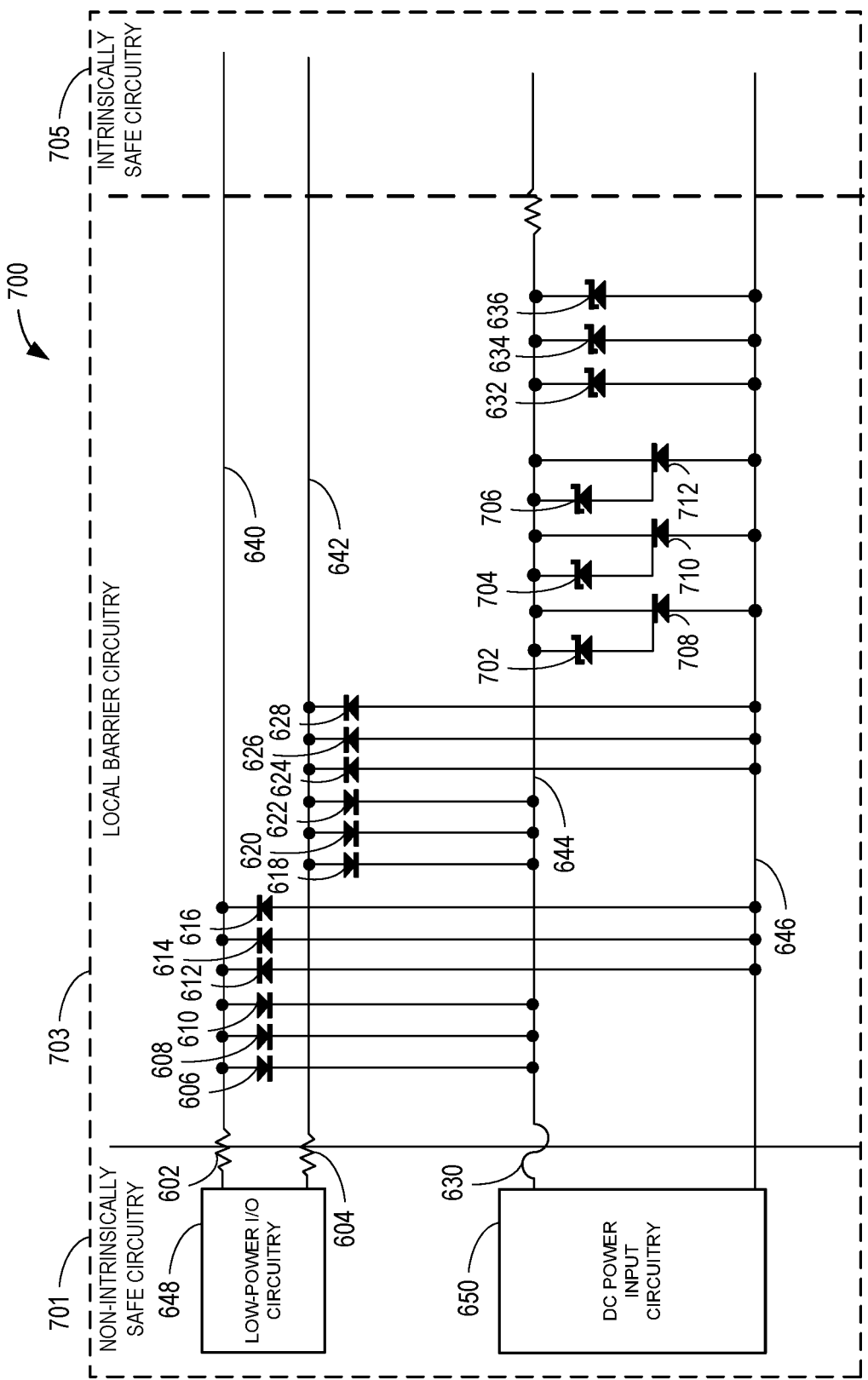
FIG. 7 is a schematic illustration of a second example implementation of the instrument of FIGS. 1, 2, and/or 3A-3C.

FIG. 7 is a schematic illustration representative of second example field instrument circuitry 700 including second example non-intrinsically safe circuitry 701, second example local barrier circuitry 703, and second example intrinsically safe circuitry 705. The second example field instrument 700 is representative of a second example implementation of the instrument 102 of FIGS. 1, 2, and/or 3A-C. The second example non-intrinsically safe circuitry 701 is an example implementation of at least a portion of the non-intrinsically safe circuitry 202 of FIGS. 2 and/or 4. The second example local barrier circuitry 703 is an example implementation of the local barrier circuitry 204 of FIGS. 2 and/or 3A-3C. The second example intrinsically safe circuitry 705 is an example implementation of at least a portion of the intrinsically safe circuitry 206 of FIGS. 2, 3A-3C, and/or 5.

In the illustrated example of FIG. 7, the second example field instrument circuitry 700 includes the first resistor 602, the second resistor 604, the first diode 606, the second diode 608, the third diode 610, the fourth diode 612, the fifth diode 614, the sixth diode 616, the seventh diode 618, the eighth diode 620, the ninth diode 622, the tenth diode 624, the eleventh diode 626, the twelfth diode 628, the fuse 630, the first Zener diode 632, the second Zener diode 634, the third Zener diode 636, the third resistor 638, the first electrical coupling 640, the second electrical coupling 642, the third electrical coupling 644, the fourth electrical coupling 646 the low-power I/O circuitry 648, and the DC power input circuitry 650 of FIG. 6. Additionally, the second example local barrier circuitry 703 includes a fourth Zener diode 702, a fifth Zener diode 704, a sixth Zener diode 706, a first semiconductor controlled rectifier (SCR) 708, a second SCR 710, and a third SCR 712.

In the illustrated example of FIG. 7, first terminals of the fourth, fifth, and sixth Zener diodes 702, 704, 706 are coupled to the third electrical coupling 644. Further, respective second terminals of the fourth, fifth, and sixth Zener diodes 702, 704, 706 are coupled to respective first terminals (e.g., gate terminals) of the first, second, and third SCRs 708, 710, 712. In the illustrated example of FIG. 7, second terminals (e.g., anodes) of the first, second, and third SCRs 708, 710, 712 are coupled to the fourth electrical coupling 646, and third terminals (e.g., cathodes) of the first, second, and third SCRs 708, 710, 712 are coupled to the third electrical coupling 644.

In example operation, the fourth, fifth, and/or sixth Zener diode(s) 702, 704, 706 enable current to flow from the third electrical coupling 644 to the gate terminal(s) of the respective SCR(s) 708, 710, 712 in response to encountering a voltage at the third electrical coupling 644 that satisfies (e.g., is greater than, is greater than or equal to) a first voltage threshold (e.g., the Zener voltage of the fourth, fifth, and sixth Zener diodes 702, 704, 706). In such example operation, the fourth, fifth, and sixth Zener diodes 702, 704, 706 limit (e.g., clamp) the voltage that can pass from the third electrical coupling 644 to the gate terminal(s) of the respective SCR(s) 708, 710, 712. When the clamped voltage that the fourth, fifth, and/or sixth Zener diode(s) 702, 704, 706 deliver to the gate terminal(s) of the SCR(s) 702, 704, 706 satisfies (e.g., is greater than, is greater than or equal to) a second voltage threshold, the SCR(s) 702, 704, 706 to conduct from the third electrical coupling 644 to the fourth electrical coupling 646. In particular, the SCR(s) 702, 704, 706 conduct the voltage across the Zener diode(S) 702, 704, 706 that is received at the gate terminal(s) from the third electrical coupling 644 to the fourth electrical coupling 646. In response to conducting, the SCR(s) 708, 710, 712 cause the fuse 630 to trip, which dissipates the power associated with a fault from the non-intrinsically safe circuitry 701. In some examples, the intrinsically safe circuitry 705 renders an alert indicative of the fault in response to receiving a voltage that does not satisfy (e.g., is less than, is less than or equal to) a fourth voltage threshold. In such examples, the reduced (e.g., clamped) voltage that the SCR(s) 708, 710, 712 conduct after causing the fuse 630 to trip does not satisfy the fourth voltage threshold. As a result, the intrinsically safe circuitry 206 can notify an operator in response to a fault in the non-intrinsically safe circuitry 701 occurring without having to withstand any damage from the fault.

Additionally, the first, second, and/or third Zener diode(s) 632, 634, 636 transport signals from the third electrical coupling 644 to the fourth electrical coupling 646 in response to encountering a voltage at the third electrical coupling 644 that satisfies (e.g., is greater than, is greater than or equal to) a third voltage threshold (e.g., the Zener voltage of the first, second, and/or third Zener diode(s) 632, 634, 636). In the illustrated example of FIG. 7, the first voltage threshold and the second voltage threshold are less than the third voltage threshold such that the fourth, fifth, and/or sixth Zener diode(s) 702, 704, 706 cause the SCR(s) 708, 710, 712 to trip before signals pass from the third electrical coupling 644 to the fourth electrical coupling 646 through the first, second, and/or third Zener diode(s) 632, 634, 636. Advantageously, the SCR(s) 708, 710, 712 can safely dissipate the electrical power associated with the fault in the instrument 102 while preventing components from overheating and being incapable of handling subsequent faults. On the other hand, the Zener diodes 632, 634, 636 are susceptible to overheating after having to dissipate a certain amount of power.

Figure 8:
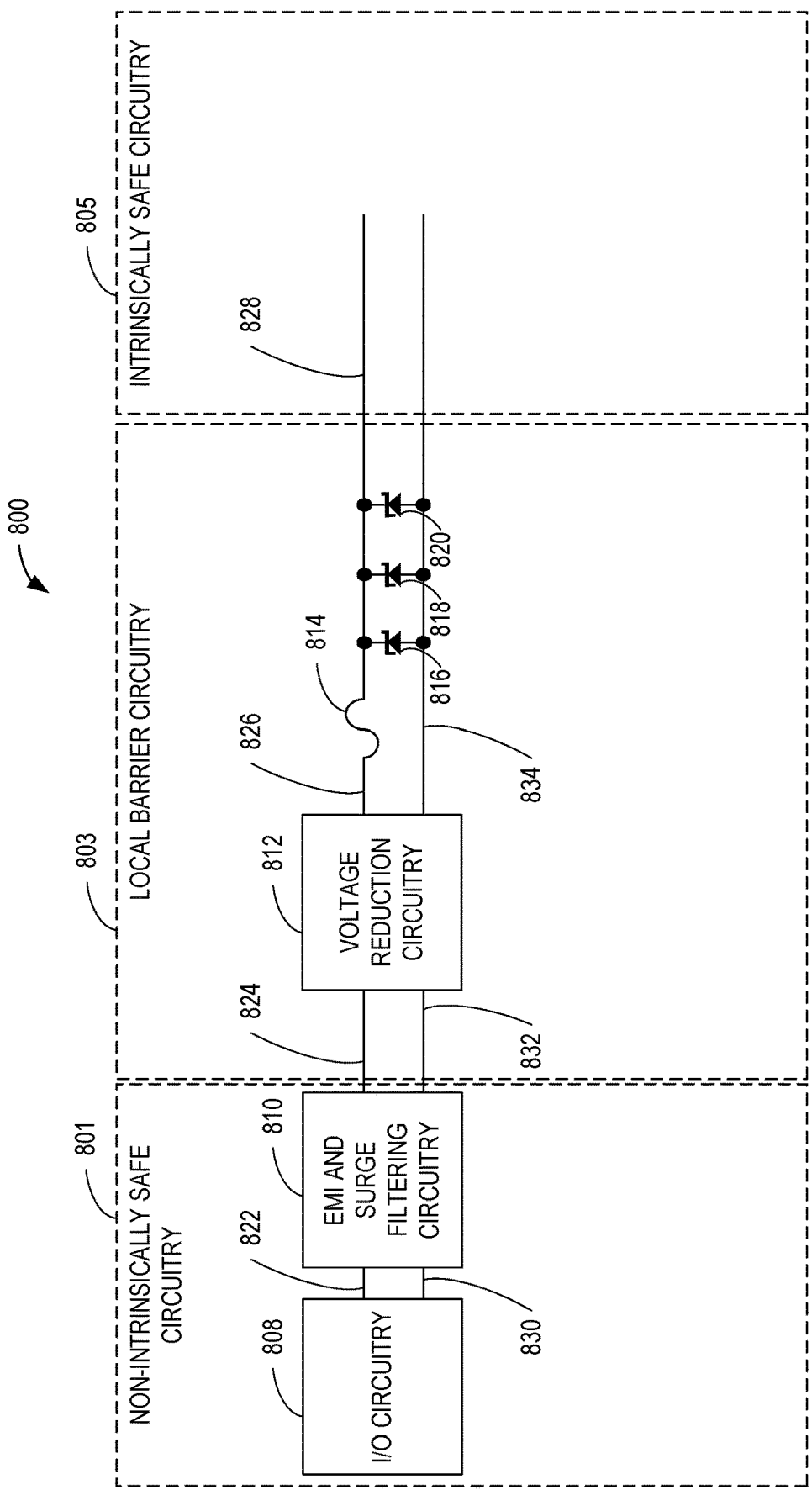
FIG. 8 is a schematic illustration of a third example implementation of the instrument of FIGS. 1, 2, and/or 3A-3C.

FIG. 8 is a schematic illustration representative third example field instrument circuitry 800 including third example non-intrinsically safe circuitry 801, third example local barrier circuitry 803, and third example intrinsically safe circuitry 805. The third example field instrument 800 is representative of a third example implementation of the instrument 102 of FIGS. 1, 2, and/or 3A-C. The third example non-intrinsically safe circuitry 801 is an example implementation of at least a portion of the non-intrinsically safe circuitry 202 of FIGS. 2 and/or 4. The third example local barrier circuitry 803 is an example implementation of the local barrier circuitry 204 of FIGS. 2 and/or 3A-3C. The third example intrinsically safe circuitry 805 is an example implementation of at least a portion of the intrinsically safe circuitry 206 of FIGS. 2, 3A-3C, and/or 5.

In the illustrated example of FIG. 8, the non-intrinsically safe circuitry 801 includes example I/O circuitry 808 and example electromagnetic interference (EMI) and surge filtering circuitry 810. The local barrier circuitry 803 includes example voltage reduction circuitry 812, an example fuse 814, a first example Zener diode 816, a second example Zener diode 818, and a third example Zener diode 820. In the illustrated example of FIG. 8, the instrument circuitry 800 also includes one or more first example electrical coupling(s) 822, one or more second example electrical coupling(s) 824, one or more third example electrical coupling(s) 826, one or more fourth example electrical coupling(s) 828, one or more fifth example electrical coupling(s) 830, one or more sixth example electrical coupling(s) 832, and one or more seventh example electrical coupling(s) 834 connecting the non-intrinsically safe circuitry 801, the local barrier circuitry 803, and the intrinsically safe circuitry 805.

In the illustrated example of FIG. 8, the first electrical coupling(s) 822 are connected to a first terminal of the I/O circuitry 808 and a first terminal of the EMI and surge filtering circuitry 810. The second electrical coupling(s) 824 are connected to a second terminal of the EMI and surge filtering circuitry 810 and a first terminal of the voltage reduction circuitry 812. The third electrical coupling(s) 826 are connected to a second terminal of the voltage reduction circuitry 812 and a first terminal of the fuse 814. The fourth electrical coupling(s) 828 are connected to a second terminal of the fuse 814, a first terminal of the first Zener diode 816, a first terminal of the second Zener diode 818, a first terminal of the third Zener diode 820, and the intrinsically safe circuitry 805. The fourth electrical coupling(s) 830 are connected to a second terminal of the I/O circuitry 808 and a third terminal of the EMI and surge filtering circuitry 810. The fifth electrical coupling(s) 832 are connected to a fourth terminal of the EMI and surge filtering circuitry 810 and a third terminal of the voltage reduction circuitry 812. The sixth electrical coupling(s) 834 are connected to a fourth terminal of the voltage reduction circuitry 812, a second terminal of the first Zener diode 816, a second terminal of the second Zener diode 818, a second terminal of the third Zener diode 820, and the intrinsically safe circuitry 805.

The I/O circuitry 808 of FIG. 8 may include cables that extend external to the instrument 800. As such, signals from the I/O circuitry 808 may have encountered electromagnetic interference external to the instrument 800. In example operation, the EMI and surge filtering circuitry 810 filters out any electromagnetic interference effects on the signals from the I/O circuitry 808 and, thus, enables downstream circuitry to function without being affected by such electromagnetic interference.

In example operation, when the Zener diode(s) 816, 818, 820 encounter a voltage signal across the fourth electrical coupling(s) 828 and the seventh electrical coupling(s) 834 with a voltage greater than a voltage threshold (e.g., the Zener voltage), the Zener diode(s) 816, 818, 820 clamp the voltage. As a result, the Zener diode(s) 816, 818, 820 limit the electrical energy being delivered to the intrinsically safe circuitry 805 to prevent the intrinsically safe circuitry 805 from sparking and causing an ignition in response to receiving a signal that exceeds the ratings of components of the intrinsically safe circuitry 805. Additionally, the fuse 814 opens in response to encountering a current flow in the first electrical coupling 822 that exceeds a current threshold.

In example operation, the voltage reduction circuitry 812 limits a voltage of signals that are delivered to the Zener diode(s) 816, 818, 820. As such, the voltage reduction circuitry 812 prevents the voltage from exceeding the ratings of the Zener diode(s) 816, 818, 820. In turn, when a fault occurs, the voltage reduction circuitry 812 can dissipate power to prevent the Zener diode(s) 816, 818, 820 from short-circuiting and being unable to clamp the voltage being delivered to the intrinsically safe circuitry 805 when a subsequent fault occurs. Thus, the voltage reduction circuitry 812 helps maintain a functionality of the Zener diode(s) 816, 818, 820, which allows the Zener diode(s) 816, 818, 820 to clamp the voltage being delivered to the intrinsically safe circuitry 805 even after multiple faults have previously been encountered.

Figure 9:
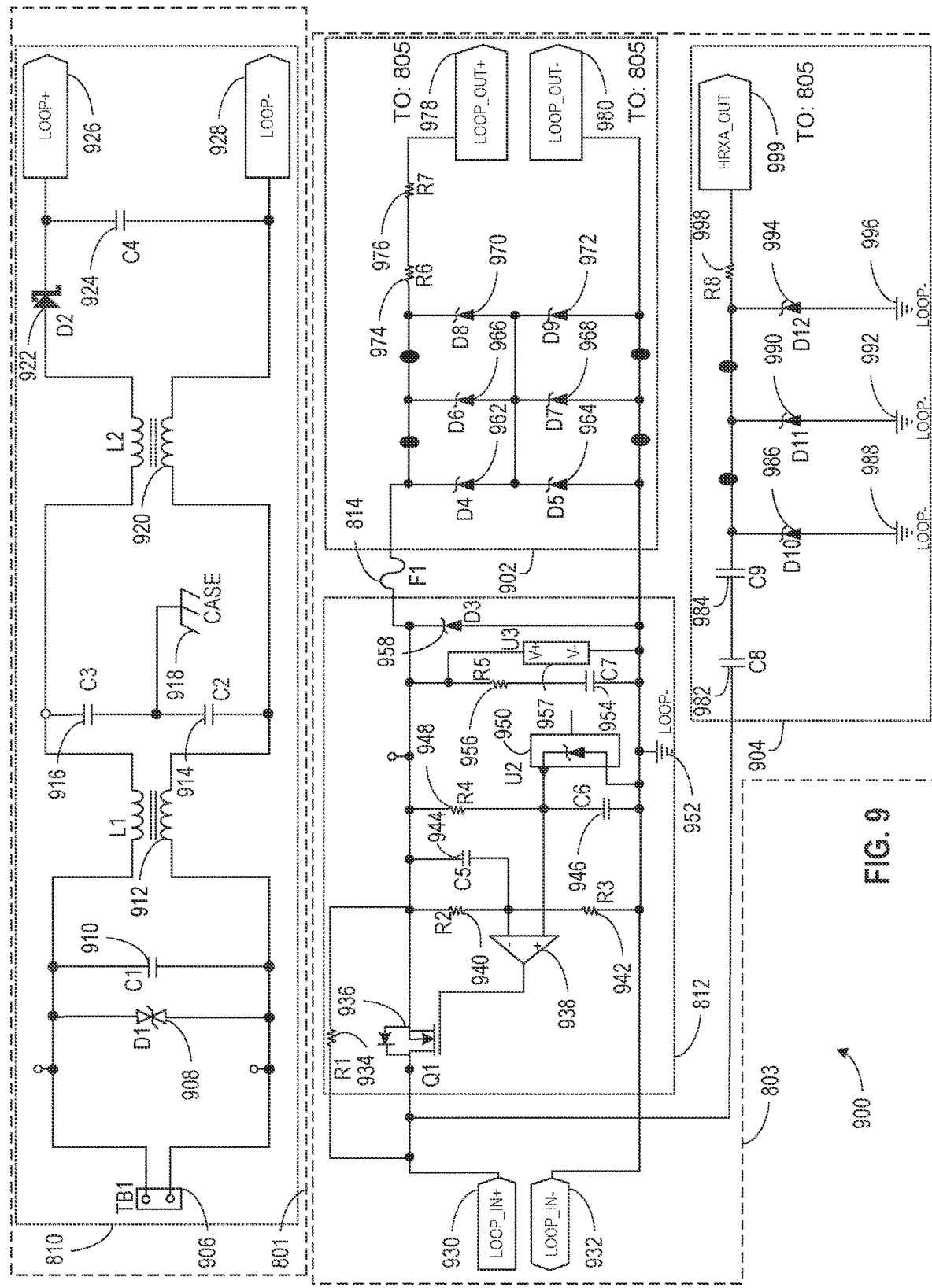
FIG. 9 is a schematic illustration of a fourth example implementation of the instrument of FIGS. 1, 2, and/or 3A-3C.

FIG. 9 is another example circuit schematic 900 representative of a fourth example implementation of the instrument 102 of FIGS. 1, 2, and/or 3A-3C. Specifically, the example circuit schematic 900 of FIG. 9 depicts an example implementation of the non-intrinsically safe circuitry 801 and the local barrier circuitry 803 of FIG. 8. In the illustrated example of FIG. 9, the non-intrinsically safe circuitry 801 includes the EMI and surge filtering circuitry 810. Additionally, in the illustrated example of FIG. 9, the local barrier circuitry 803 includes the example voltage reduction circuitry 812, the example fuse 814, example control signal barrier circuitry 902, and example communication signal barrier circuitry 904.

In the illustrated example of FIG. 9, the EMI and surge filtering circuitry 810 includes an example terminal block 906 (TB1), a first example diode 908 (D1) (e.g., an example bidirectional transient-voltage-suppression (TVS) diode), a first example capacitor 910 (C1), a first example transformer 912 (e.g., a common mode choke) (L1), a second example capacitor 914 (C2), a third example capacitor 916 (C3), a first example ground 918 (CASE) (e.g., a chassis ground), a second example transformer 920 (L2), a second example diode 922 (D2) (e.g., an example Schottky diode), a fourth example capacitor 924 (C4), a first example loop output terminal 926 (LOOP+), and a second example loop output terminal 928 (LOOP−).

In the illustrated example of FIG. 9, the voltage reduction circuitry 803 includes a first example loop input terminal 930 (LOOP_IN+), a second example loop input terminal 932 (LOOP_IN−), a first example resistor 934 (R1), an example transistor 936 (Q1) (e.g., an N-channel metal-oxide-semiconductor field-effect transistor (MOSFET), a switch), a first example operational amplifier 938 (U3) (, a second example resistor 940 (R2), a third example resistor 942 (R3), a fifth example capacitor 944 (C5), a sixth example capacitor 946 (C6), a fourth example resistor 948 (R4), a second example integrated circuit 950 (U2) (e.g., an example shunt voltage reference circuitry), a second example ground 952 (LOOP−), a seventh example capacitor 954 (C7), a fifth example resistor 956 (R5), power connection circuitry 957 (U3) (e.g., power connections of the operational amplifier 938), and a third example diode 958 (D3) (e.g., a first example Zener diode). The power connection circuitry 957 and the operational amplifier 938 may include in the same integrated circuit (U3).

In the illustrated example of FIG. 9, the control signal barrier circuitry 902 includes a fourth example diode 962 (D4) (e.g., a second example Zener diode), a fifth example diode 964 (D5) (e.g., a third example Zener diode), a sixth example diode 966 (D6) (e.g., a fourth example Zener diode), a seventh example diode 968 (D7) (e.g., a fifth example Zener diode), an eighth example diode 970 (D8) (e.g., a sixth example Zener diode), a ninth example diode 972 (D9) (e.g., an seventh example Zener diode), a sixth example resistor 974 (R6), a seventh example resistor 976 (R7), a third example loop output terminal 978 (LOOP_OUT+), and a fourth example loop output terminal 980 (LOOP_OUT−).

In the illustrated example of FIG. 9, the communication signal barrier circuitry 904 includes an eighth example capacitor 982 (C8), a ninth example capacitor 984 (C9), a tenth example diode 986 (D10) (e.g., an eighth example Zener diode), a third example ground 988 (LOOP−), an eleventh example diode 990 (D11) (e.g., a ninth example Zener diode), a fourth example ground 992 (LOOP−), a twelfth example diode 994 (D12) (e.g., a tenth example Zener diode), a fifth example ground 996 (LOOP−), an eighth example resistor 998 (R8), and a fifth example loop output terminal 999 (HRXA_OUT).

In the non-intrinsically safe circuitry 801, a first terminal of the terminal block 906 is coupled to a first terminal of the first diode 908, a first terminal of the first capacitor 910, and a first terminal of the first transformer 912. A second terminal of the terminal block 906 is coupled to a second terminal of the first diode 908, a second terminal of the first capacitor 910, and a second terminal of the first transformer 912. A third terminal of the first transformer 912 is coupled to a first node of the third capacitor 916 and a first terminal of the second transformer 920. A fourth terminal of the second transformer 920 is coupled to a first terminal of the second capacitor 914 and a second terminal of the second transformer 920. A second terminal of the second capacitor 914 and a second terminal of the third capacitor 916 are coupled to the first ground 918. In the illustrated example of FIG. 9, the first ground 918 is defined by a chassis of the instrument 102. For example, the first ground 918 can be defined in the protection compartment 106. Further, a third terminal of the second transformer 920 is coupled to an anode terminal of the second diode 922. A first terminal of the fourth capacitor 924 is coupled to a cathode terminal of the second diode 922 and the first loop output terminal 926. A second terminal of the fourth capacitor 924 is coupled to a fourth terminal of the second transformer 920 and the second loop output terminal 928.

In the illustrated example of FIG. 9, the first loop output terminal 926 is coupled to the first loop input terminal 930, and the second loop output terminal 928 is coupled to the second loop input terminal 932. For example, the output terminals 926, 928 can be coupled to the input terminals 930, 932 via respective electrical couplings (e.g., wires, flex cables, etc.).

In the voltage reduction circuitry 803, the first loop input terminal 930 is coupled to a first terminal of the first resistor 934, a first terminal of the eighth capacitor 982, and a drain terminal of the first transistor 936. A second terminal of the first resistor 934 and a source terminal of the first transistor 936 are coupled to a first terminal of a second resistor 940. The first terminal of the second resistor 940 is also coupled to a first terminal of the fifth capacitor 944. The first terminal of the fifth capacitor 944 is also coupled to a first terminal of the fourth resistor 948. A second terminal of the fifth capacitor 944, a second terminal of the second resistor 940, and a first terminal of the third resistor 942 are coupled to an inverting input terminal (designated by the '−' symbol) of the operational amplifier 938. A second terminal of the third resistor 942 is coupled to the second loop input terminal 932. The second loop input terminal 932 is also coupled to a first terminal of the sixth capacitor 946 an input terminal of the shunt voltage reference 950, and the second ground terminal 952. An output terminal of the shunt voltage reference 950, the second terminal of the fourth resistor 948, and a second terminal of the sixth capacitor 946 are coupled to a non-inverting input terminal (designated with a '+' symbol) of the operational amplifier 938. An output terminal of the operational amplifier 938 is coupled to a gate terminal of the transistor 936.

Further, the second ground terminal 952 is coupled to a first terminal of the seventh capacitor 954, an input terminal of the operational amplifier 957, respective anode terminals of the third, fifth, seventh, and ninth diodes 958, 964, 968, 972, and the fourth loop output terminal 980. A second terminal of the seventh capacitor 954 is coupled to a first terminal of the fifth resistor 956. A second terminal of the fifth resistor is coupled to an output terminal of the operational amplifier 957. A cathode terminal of the third diode 958 is a coupled to a first terminal of the fuse 814. A second terminal of the fuse 814 is coupled to respective cathode terminals of the fourth, sixth, and eighth diodes 962, 966, 970 and a first terminal of the sixth resistor 974. Cathode terminals of the fifth, seventh, and ninth diodes 964, 968, 972 are coupled to anode terminals of the fourth, sixth, and eighth terminals 962, 966, 970. A second terminal of the sixth resistor 974 is coupled to a first terminal of the seventh resistor 976. A second terminal of the seventh resistor 976 is coupled to the third loop output terminal 978.

Additionally, in the communication signal barrier circuitry 904, a second terminal of the eighth capacitor 982 is coupled to a first terminal of the ninth capacitor 984. A second terminal of the ninth capacitor 984 is coupled to cathode terminals of the tenth, eleventh, and twelfth diodes 986, 990, 994 and a first terminal of the eighth resistor 998. Respective anode terminals of the tenth, eleventh, and twelfth diodes 986, 990, 994 are coupled to the third, fourth, and fifth ground terminals 988, 990, 994, respectively. A second terminal of the eighth resistor 998 is coupled to the fifth loop output terminal 999.

In example operation, the non-intrinsically safe circuitry 801 and the voltage reduction circuitry 812 encounter voltages up to 250 V as a result of the local barrier circuitry 803 not being external to the instrument 102. To prevent such large voltages from impacting the information being relayed to the intrinsically safe circuitry 805 given the close proximity of the intrinsically safe circuitry 805 in the instrument 102, the fuse 814 and the Zener diodes 962, 964, 966, 968, 970, 972 clamp the voltage to a safe level for the intrinsically safe circuitry 805. The capacitors 982, 984 and the Zener diodes 986, 990, 994 similarly clamp the voltage of a signal relaying additional information to the intrinsically safe circuitry 805.

In example operation, the EMI and surge filtering circuitry 810 extracts and removes electromagnetic noise in the lines relaying signals that are being transmitted to the local barrier circuitry 803. In example operation, the first capacitor 910 stabilizes a voltage and/or power flow received by the common mode choke 912. The first common mode choke 912 is configured to suppress common mode noise without attenuating the signal. In example operation, the second capacitor 914 and the third capacitor 916 direct high-frequency noise through a low-impedance path to the ground 918. Further, the second transformer 920 is configured to suppress electromagnetic interference. In example operation, the second diode 922 clamps the voltage being transmitted to the first terminal of the fourth capacitor 924 and prevents current from flowing back towards the third terminal of the second transformer 920. In example operation, the fourth capacitor 924 stabilizes the voltage and/or power flowing towards the first loop output terminal 926 and the second loop output terminal 928.

In example operation, the first loop input terminal 930 relays signals from the first loop output terminal 926. In example operation, the voltage reduction circuitry 812 receives (e.g., via the first resistor 934 and the transistor 936) a first portion and the communication signal barrier circuitry 904 receives (e.g., via the eighth capacitor 982) a second portion of the signals from the first loop input terminal 930. In example operation, the second loop input terminal 932 receives signals from the second loop output terminal 928 and relays the signals to the third resistor 942, the sixth capacitor 946, the shunt voltage reference circuitry 950, the ground 952, the seventh capacitor 954, the operational amplifier circuitry 957, the third diode 958, and/or the control signal barrier circuitry 902. Specifically, the shunt voltage reference circuitry 950 transmits a stable voltage as reference for the non-inverting input of the operational amplifier 938. As such, the operational amplifier 938 can compare the reference to the voltage received at the inverting input of the operational amplifier 938. In example operation, the first resistor 934, the transistor 936, the second resistor 940, the third resistor 942, and/or the fifth capacitor 944 are configured to condition the signals relayed to the inverting input of the operational amplifier 938. In example operation, the sixth capacitor 946, the fourth resistor 948, and the operational amplifier circuitry 957 are configured to condition the signals relayed to the non-inverting input of the operational amplifier 938.

In example operation, the operational amplifier 938 is configured to amplify a difference between the respective inverting and non-inverting inputs thereof. The operational amplifier 938 outputs a positive voltage when the non-inverting input receives a greater voltage than the inverting input. Otherwise, when the inverting input receives a greater voltage than the non-inverting input, the operational amplifier 938 outputs a negative voltage. In example operation, the transistor 936 is configured to enable electrical current to flow from the drain terminal to the source terminal except when the voltage at the gate terminal of the transistor 936 satisfies a threshold (e.g., is negative with respect to the source terminal of the transistor 936). Furthermore, the amount of electrical current flowing from the drain terminal to the source terminal is proportional to the negative voltage that the transistor 936 receives at the gate terminal. In some example operations, when the output voltage at the source terminal of the transistor 936 satisfies a threshold, the operational amplifier 938 receives a greater voltage at the inverting input terminal than the non-inverting input terminal. In such example operations, the gate terminal of the transistor 936 receives a negative voltage, which causes the switch formed by the transistor 936 to open and prevent current from flowing from the drain terminal to the source terminal. Further, when the transistor 936 is open, electrical signals that would have otherwise passed through the transistor 936 flow through the first resistor 934 thereby reducing the voltage associated therewith. As a result, the transistor 936 is configured to limit the voltage delivered to the fuse 814 and/or the control signal barrier circuitry 902. In example operation, the fuse 814 opens in response to encountering a current that exceeds a current threshold. When the fuse 814 opens, the fuse 814 cuts off power that would have otherwise been delivered to the Zener diodes 962, 964, 966, 968, 970, 972 and, thus, protects a functionality thereof. Thus, the transistor 936 and the fuse 814 reduce power when a fault is encountered in the non-intrinsically safe circuitry 801.

In example operation, the control signal barrier circuitry 902 delivers a signal to the intrinsically safe circuitry 805 that controls an operation of the process control system 100. For example, the process control circuitry 530 can cause a positional adjustment of a valve (e.g., the valve 118 of FIG. 1) based on the signal (e.g., via the pneumatic connection 120 and the actuator 116 of FIG. 1). In example operation, when one or more of the Zener diode(s) 962, 964, 966, 968, 970, 972 encounters a voltage at its/their respective cathode terminal(s) that satisfies a voltage threshold (e.g., the Zener voltage rating), the Zener diode(s) 962, 964, 966, 968, 970, 972 clamp the voltage and enable the clamped voltage to pass to the anode terminal of the respective Zener diode(s) 962, 964, 966, 968, 970, 972. Specifically, the second, fourth, and/or sixth Zener diode(s) 962, 966, 970 clamp the voltage delivered to the cathode terminal(s) of the third, fifth, and/or seventh Zener diode(s) 964, 968, 972. Further, the third, fifth, and/or seventh Zener diode(s) 964, 968, 972 clamp the voltage delivered to the fourth loop output terminal 980. Thus, the control signal barrier circuitry 902 relays process control signals to the intrinsically safe circuitry 805 while preventing faults in the non-intrinsically safe circuitry 801 from resulting in the intrinsically safe circuitry 805 receiving signals that exceed the ratings thereof.

In example operation, the communication signal barrier circuitry 904 delivers a signal to the intrinsically safe circuitry 805 indicative of information associated with the process control system 100, such as a status and/or configuration. For example, when the signal originates from a HART, a first status can be communicated via a 4-20 mA loop current and a second status can be communicated via a dig digital signal overlaid on the 4-20 mA loop current. In example operation, when the ninth Zener diode 986, the tenth Zener diode 990, and/or the eleventh Zener diode 994 receives a voltage at its/their respective cathode terminal(s) that satisfies a voltage threshold (e.g., the Zener voltage rating), the Zener diode(s) 986, 990, 994 clamp the voltage and deliver the clamped voltage to the ground 988, 992, 996 in connection with the anode terminal of the respective Zener diode 986, 990, 994. As a result, the Zener diodes 986, 990, 994 prevent the fifth example loop output terminal 999 from relaying such signals to the intrinsically safe circuitry 805 and, thus, protect the intrinsically safe circuitry 805 when the non-intrinsically safe circuitry 801 encounters a fault that produces a signal with parameters that exceed the ratings of the intrinsically safe circuitry 805.

While an example manner of implementing the instrument 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example non-intrinsically safe circuitry 202, the first interface circuitry 410, the limit switch circuitry 420, the filter circuitry 430, the HART communication circuitry 440, the local barrier circuitry 204, the intrinsically safe circuitry 206, the second interface circuitry 510, the user interface circuitry 111, the process control circuitry 530, and/or, more generally, the example instrument 102 of FIG. 1, may be implemented by hardware alone or by hardware in combination with software and/or firmware. Thus, for example, any of the example non-intrinsically safe circuitry 202, the first interface circuitry 410, the limit switch circuitry 420, the filter circuitry 430, the HART communication circuitry 440, the local barrier circuitry 204, the intrinsically safe circuitry 206, the second interface circuitry 510, the user interface circuitry 111, the process control circuitry 530, and/or, more generally, the example instrument 102, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example instrument 102 of FIG. 1 may include one or more elements, processes, and/or devices in addition to, or instead of, those illustrated in FIG. 2, and/or may include more than one of any or all of the illustrated elements, processes, and devices.

Figure 10:
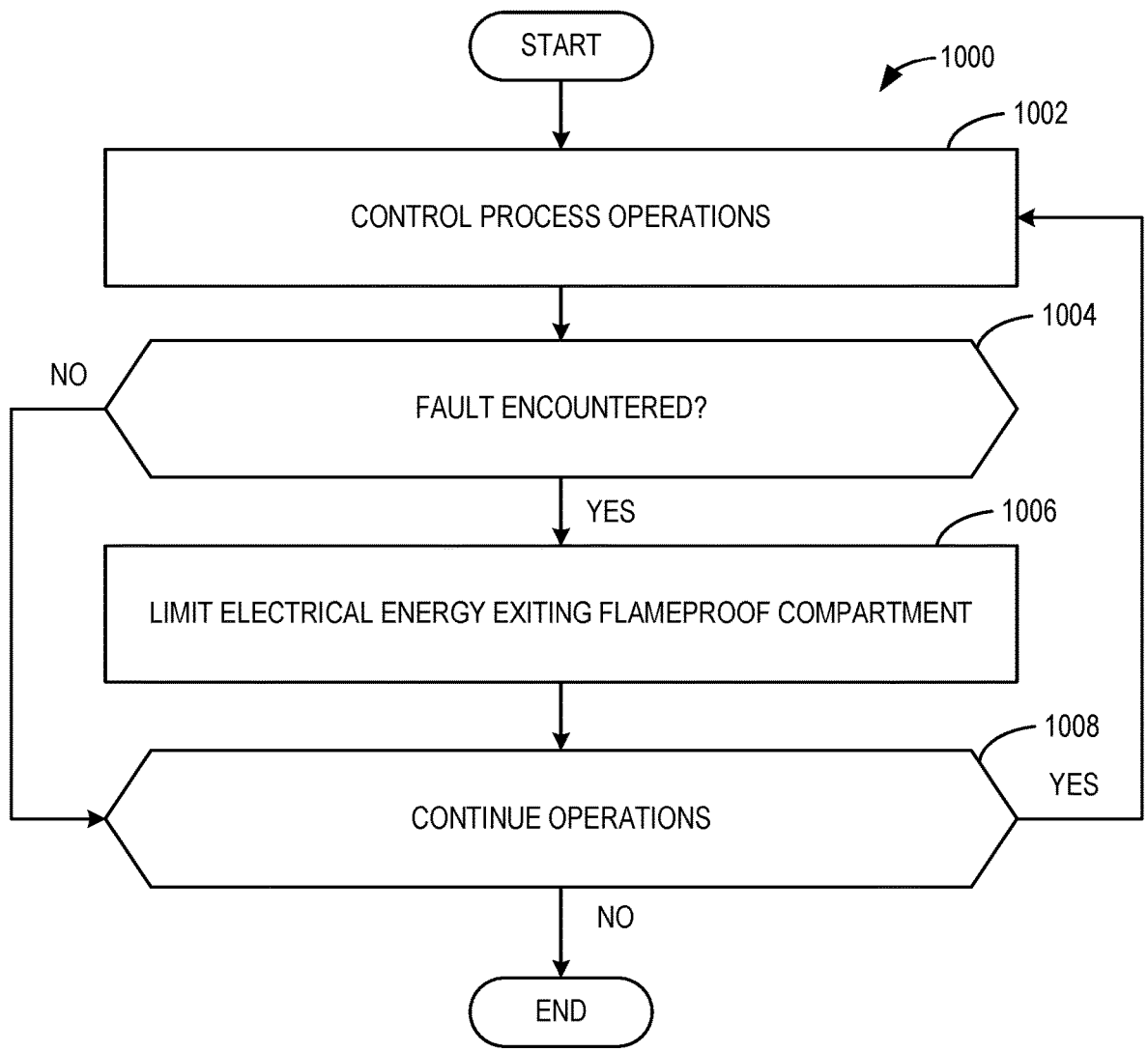
FIG. 10 is a flowchart representative of example machine readable instructions and/or example operations that may be executed by example hardware to implement the instrument of FIGS. 1, 2, and/or 3A-3C.

A flowchart representative of example machine readable instructions and/or operations, which may be executed to configure processor circuitry and/or hardware to implement the instrument 102 of FIG. 2, is shown in FIG. 10. The machine readable instructions may be one or more executable programs or portion(s) of an executable program for execution by processor circuitry, such as the processor circuitry 1212, 1312 shown in the example processor platform 1200, 1300 discussed below in connection with FIGS. 12 and 13 and/or the example processor circuitry discussed below in connection with FIGS. 14 and/or 15. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 10, many other methods of implementing the example instrument 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 10 is a flowchart representative of example machine readable instructions and/or example operations 1000 that may be executed and/or instantiated by processor circuitry to control industrial process operations while preventing a fault from propagating outside of a protection compartment of a field instrument local to an associated process control assembly. The machine readable instructions and/or the operations 1000 of FIG. 10 begin at block 1002, at which the instrument 102 controls process operations. For example, the non-intrinsically safe circuitry 202 can receive electrical power from the power supply 112, and transmit digital signals overlaid on a 4-20 mA loop current to the local barrier circuitry 204 and, in turn, the intrinsically safe circuitry 206. As a result, the intrinsically safe circuitry 206 can adjust process control operations, such as by controlling an actuator (e.g., the actuator 116), a valve (e.g., the valve 118), a pump, a motor, and/or any other device associated with adjusting process control operations. Additionally, the intrinsically safe circuitry 206 can present information associated with the process control operations to an operator via the user interface 111.

At block 1004, in response to a fault occurring, the instrument 102 causes the operations 1000 to proceed to block 1006. For example, a fault can occur in response to encountering an electrical signal having an electrical energy that satisfies an electrical energy threshold (e.g., 50 mA and/or 15V). Otherwise, the instrument 102 causes the operations 1000 to proceed to block 1008.

At block 1006, the instrument 102 limits the electrical energy that exits the protection compartment 106. For example, when the non-intrinsically safe circuitry 202 transmits a signal having an electrical energy that satisfies the electrical energy threshold to the local barrier circuitry 204, the local barrier circuitry 204 can dissipate energy associated with the fault (e.g., electrical energy and heat) and prevent the signal from reaching the intrinsically safe circuitry 206.

At block 1008, the instrument 102 continues operating and the operations 1000 return to block 1002 in response to the non-intrinsically safe circuitry 202 receiving power from the power supply 112. Otherwise, the operations 1000 terminate.

Figure 11:
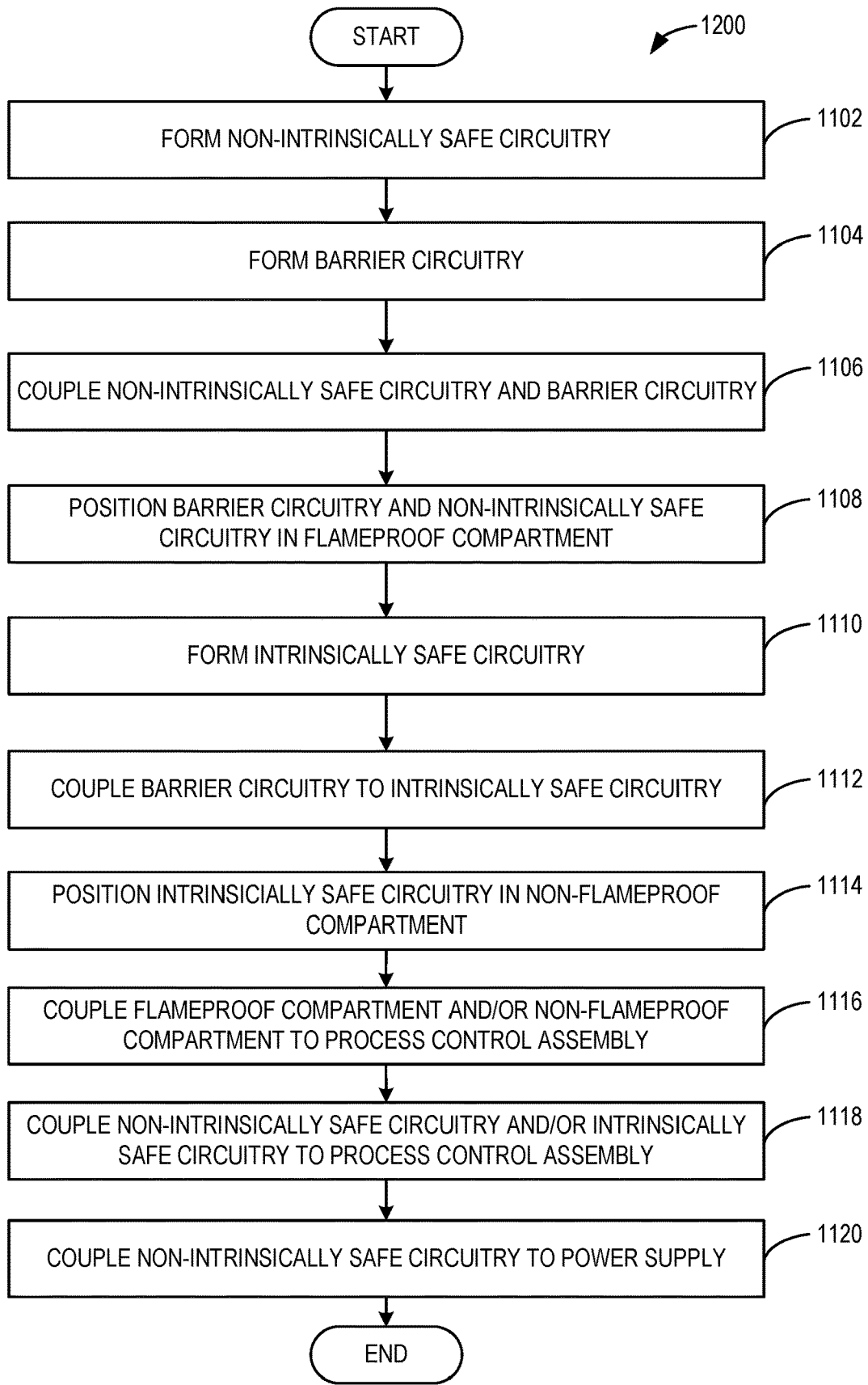
FIG. 11 is a flowchart representative of an example method to manufacture the instrument of FIGS. 1, 2, and/or 3A-3C.

FIG. 11 is a flowchart of an example method 1100 to manufacture a process control instrument, such as the instrument 102 of FIG. 1, to enable the process control instrument to be mechanically couplable to an associated assembly, such as the process control assembly 101 of FIG. 1. The example method 1100 of FIG. 11 begins at block 1102, at which non-intrinsically safe circuitry, such as the non-intrinsically safe circuitry 202, 601, 701, 801 of FIGS. 2, 6, 7, 8, and/or 9, is formed.

At block 1104, local barrier circuitry, such as the barrier circuitry 204, 603, 703, 803 of FIGS. 2, 6, 7, 8, and/or 9, is formed.

At block 1106, the local barrier circuitry is electrically coupled to the non-intrinsically safe circuitry.

At block 1108, the barrier circuitry and the non-intrinsically safe circuitry are positioned in a protection compartment, such as the protection compartment 106 of FIG. 1 and/or the protection compartment 308 of FIGS. 3A-3C. In some examples, when the barrier circuitry and the non-intrinsically safe circuitry are positioned in the protection compartment, one or more first electrical couplings coupled to the non-intrinsically safe circuitry and one or more second electrical couplings coupled to the barrier circuitry extend through respective orifices in the protection compartment. In such examples, a seal may be positioned in the orifice to prevent any ignition within the protection compartment from propagating to the external environment.

At block 1110, intrinsically safe circuitry, such as the intrinsically safe circuitry 206, 605, 705, 805 of FIGS. 2, 6, 7, 8, and/or 9, is formed.

At block 1112, the intrinsically safe circuitry is electrically coupled to the local barrier circuitry. For example, the intrinsically safe circuitry can couple to the local barrier circuitry via the second electrical coupling(s) that extend out of the protection compartment. As a result, the local barrier circuitry electrically couples the intrinsically safe circuitry to the non-intrinsically safe circuitry.

At block 1114, the intrinsically safe circuitry is positioned in a non-protection compartment, such as the non-protection compartment 104 of FIGS. 1 and/or 2, the first simple compartment 306 of FIGS. 3A-3C, and/or the second simple compartment 310 of FIGS. 3A-3C. In some examples, the intrinsically safe circuitry is positioned in the non-protection compartment with a coupling (e.g., an electrical coupling, a pneumatic coupling (e.g., the pneumatic coupling 120 of FIG. 1), a hydraulic coupling, etc.) coupled to the intrinsically safe circuitry and extending through an orifice in the non-protection compartment.

At block 1116, the protection compartment and/or the non-protection compartment are coupled to a process control assembly, such as the process control assembly 101 of FIG. 1. For example, the protection compartment and/or the non-protection compartment can be coupled to the process control assembly via mechanical couplings, welding, brazing, and/or the like.

At block 1118, the non-intrinsically safe circuitry and/or the intrinsically safe circuitry is coupled to the process control assembly. For example, the intrinsically safe circuitry can be coupled to an actuator, such as the actuator 116, and/or any other device associated with the process control assembly to control and/or monitor conditions associated with the system.

At block 1120, the non-intrinsically safe circuitry is coupled to a power supply, such as the power supply 112 of FIG. 1.

Although the example method 1100 is described with reference to the flowchart illustrated in FIG. 11, many other methods of manufacturing the instrument 102 of FIG. 1 may alternatively be used. For example, the order of execution of the blocks may be changed, and some of the blocks may be changed, eliminated, or combined. Similarly, additional operations may be included in the manufacturing process before, in between, or after the blocks shown in FIG. 11.

Figure 12:
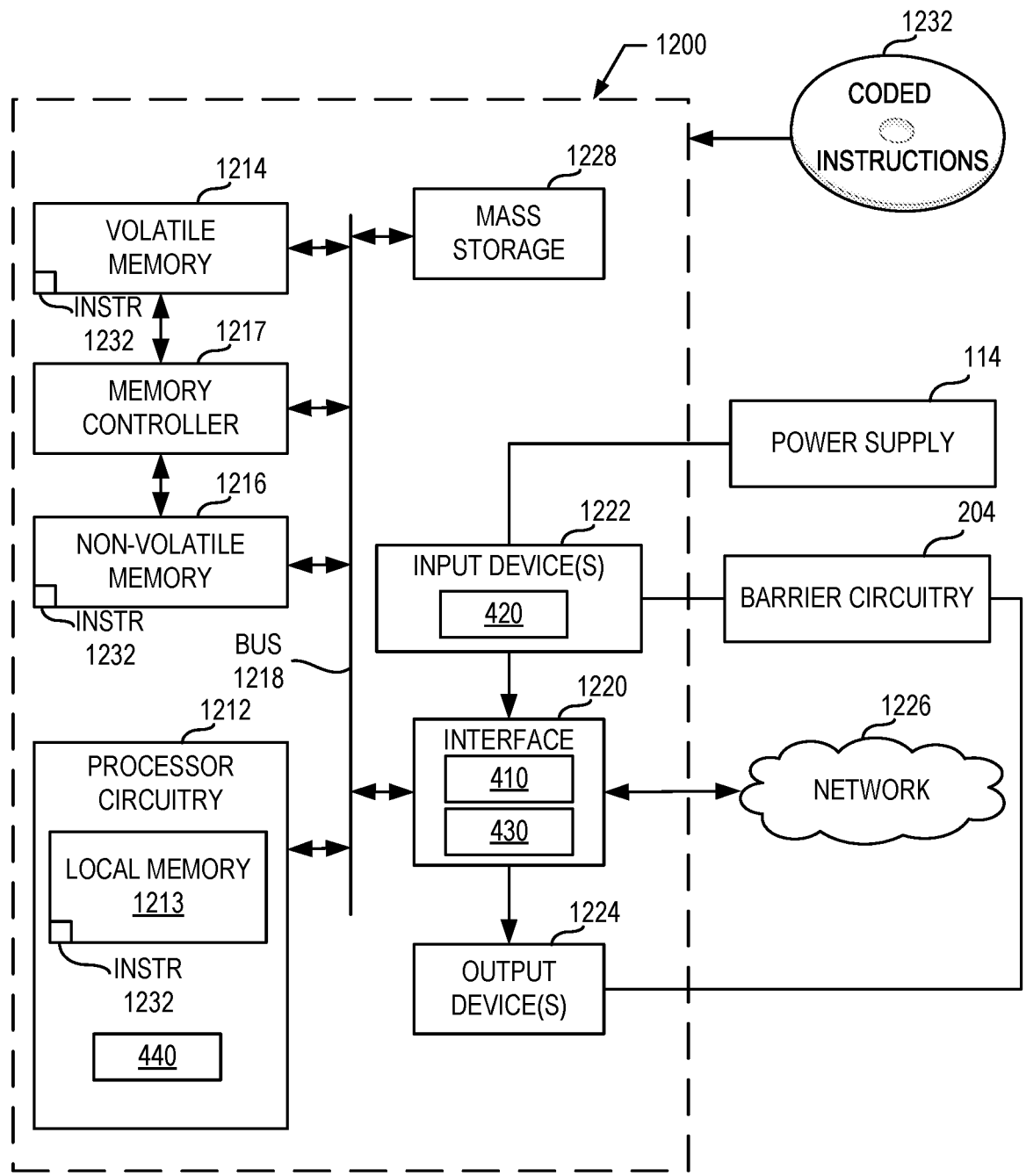
FIG. 12 is a block diagram of an example processing platform including processor circuitry structured to execute example machine readable instructions and/or operations to implement the example non-intrinsically safe circuitry of FIGS. 2 and/or 4.

FIG. 12 is a block diagram of an example processor platform 1200 structured to execute and/or instantiate the machine readable instructions and/or the operations of FIG. 10 to implement the non-intrinsically safe circuitry 202 of FIGS. 2 and/or 4. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the HART communication circuitry 440.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a USB interface, a Bluetooth® interface, an NFC interface, a PCI interface, and/or a PCIe interface. In this example, the interface circuitry 1220 implements the first interface circuitry 410 and the filter circuitry 430.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system. In this example, the input device(s) 1222 implement the limit switch circuitry 420. In this example, the power supply 114 is operatively coupled to the input device(s) 1222.

One or more output devices 1224 are also connected to the interface circuitry 1220 of the illustrated example. The output device(s) 1224 can be implemented, for example, by transmitter circuitry. The interface circuitry 1220 of the illustrated example, thus, typically includes a graphics driver card, a graphics driver chip, and/or graphics processor circuitry such as a GPU. In this example, the local barrier circuitry 204 is operatively coupled to the input device(s) 1222 and the output device(s) 1224.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1232, which may be implemented by the machine readable instructions of FIG. 10, may be stored in the mass storage device 1228, in the volatile memory 1214, in the non-volatile memory 1216, and/or on a removable non-transitory computer readable storage medium such as a CD or DVD.

Figure 13:
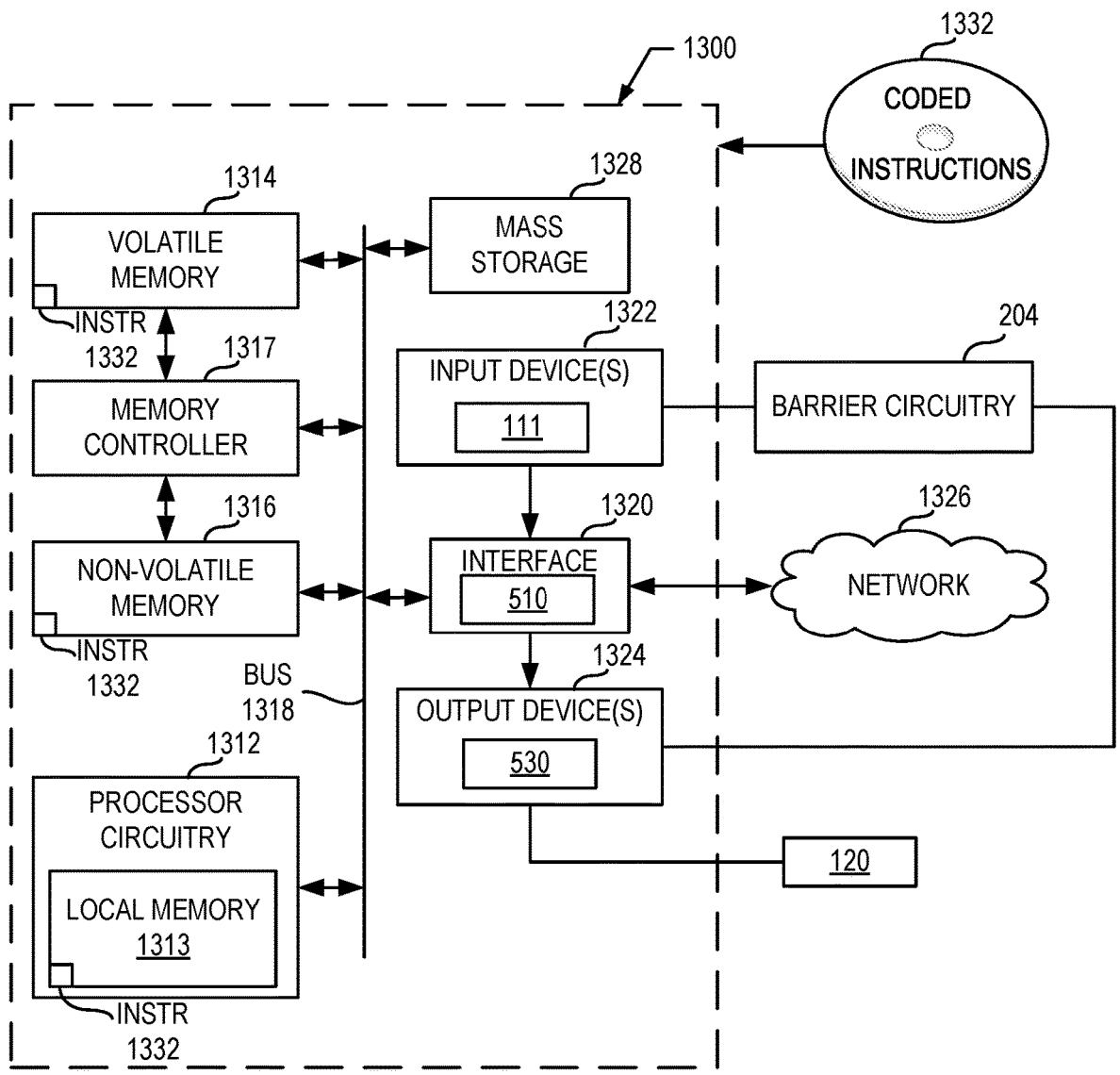
FIG. 13 is a block diagram of an example processing platform including processor circuitry structured to execute example machine readable instructions and/or operations to implement the example intrinsically safe circuitry of FIGS. 2 and/or 5.

FIG. 13 is a block diagram of an example processor platform 1300 structured to execute and/or instantiate the machine readable instructions and/or the operations of FIG. 10 to implement the intrinsically safe circuitry 206 of FIGS. 2 and/or 5. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface circuitry 1320 implements the second interface circuitry 510.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system. In this example, the input device(s) 1322 implements the user interface circuitry 111.

One or more output devices 1324 are also connected to the interface circuitry 1320 of the illustrated example. The output device(s) 1324 can be implemented, for example, by transducer circuitry, display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, \and/or speaker. The interface circuitry 1320 of the illustrated example, thus, typically includes a graphics driver card, a graphics driver chip, and/or graphics processor circuitry such as a GPU. In this example, the output device(s) implement the process control circuitry 530. In this example, the local barrier circuitry 204 is operatively coupled to the input device(s) 1322 and the output device(s) 1324.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1332, which may be implemented by the machine readable instructions of FIG. 10, may be stored in the mass storage device 1328, in the volatile memory 1314, in the non-volatile memory 1316, and/or on a removable non-transitory computer readable storage medium such as a CD or DVD.

Figure 14:
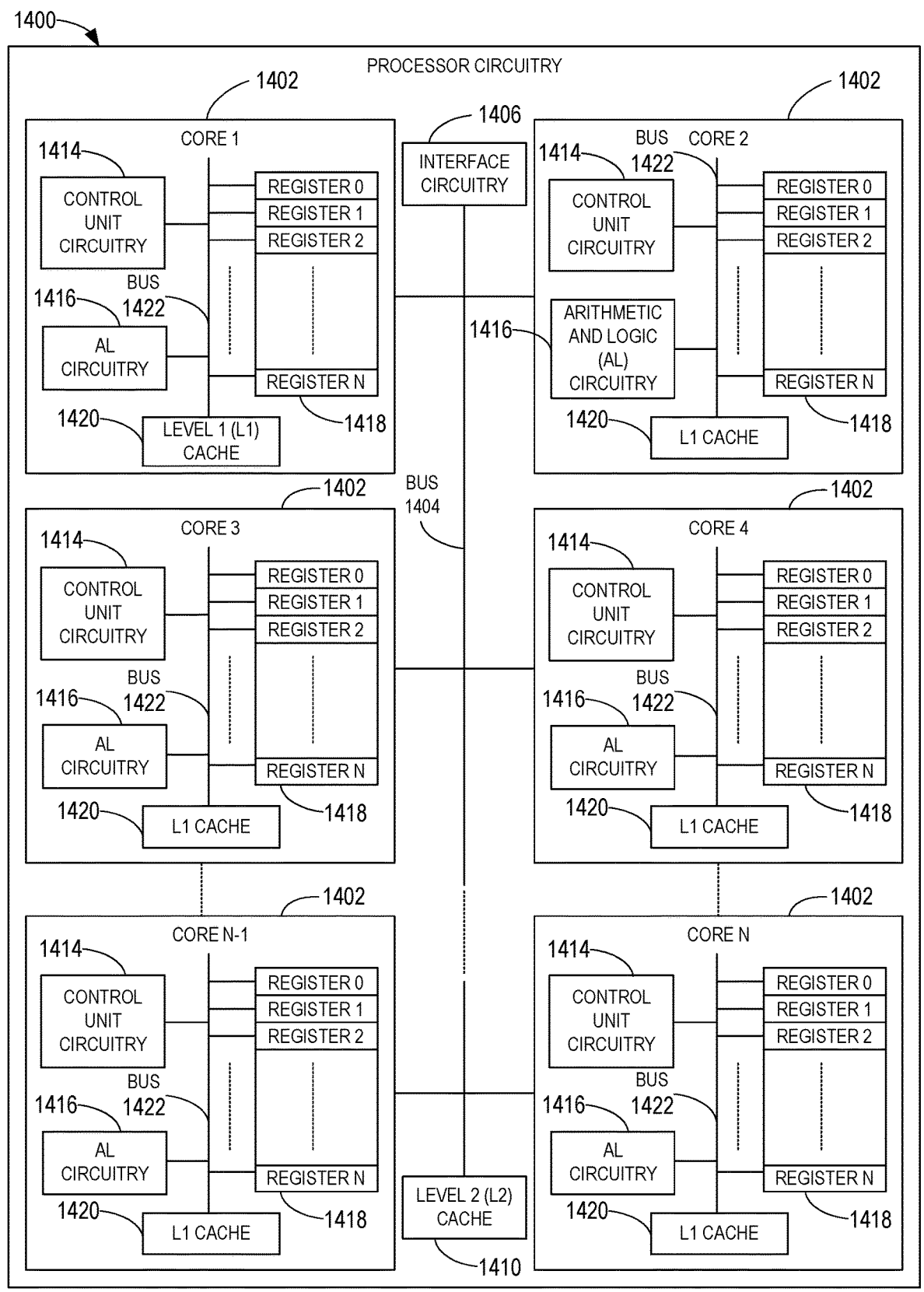
FIG. 14 is a block diagram of an example implementation of the processor circuitry of FIGS. 11 and/or 12.

FIG. 14 is a block diagram of an example implementation of the processor circuitry 1212, 1312 of FIG. 4. In this example, the processor circuitry 1212, 1312 of FIGS. 12-13 is implemented by a microprocessor 1400. For example, the microprocessor 1400 may be a general purpose microprocessor (e.g., general purpose microprocessor circuitry). The microprocessor 1400 executes some or all of the machine readable instructions of the flowchart of FIG. 10 to effectively instantiate the instrument 102 of FIG. 2 as logic circuits to perform the operations corresponding to those machine readable instructions. In some such examples, the instrument 102 of FIG. 2 is instantiated by the hardware circuits of the microprocessor 1400 in combination with the instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowchart of FIG. 10.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may be implemented by at least one of an I2C bus, a SPI bus, a PCI bus, or a PCIe bus.

Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
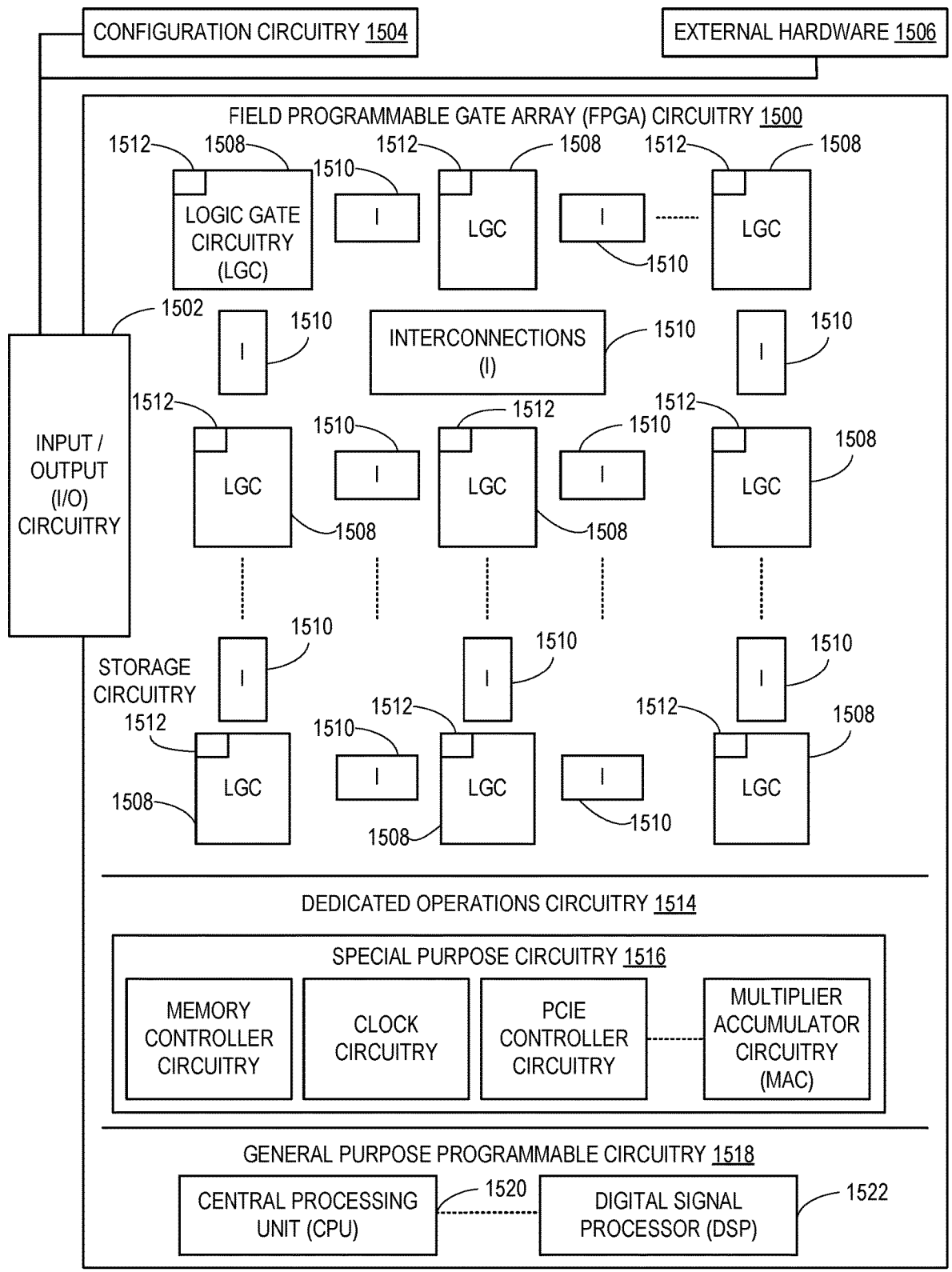
FIG. 15 is a block diagram of another example implementation of the processor circuitry of FIGS. 11 and/or 12.

FIG. 15 is a block diagram of another example implementation of the processor circuitry 1212, 1312 of FIGS. 12-13. In this example, the processor circuitry 1212, 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowchart of FIG. 10 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowchart of FIG. 10. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowchart of FIG. 10. As such, the FPGA circuitry 1500 may be structured to effectively instantiate some or all of the machine readable instructions of the flowchart of FIG. 10 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIG. 10 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may be implemented by external hardware circuitry. For example, the external hardware 1506 may be implemented by the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations that may correspond to at least some of the machine readable instructions of FIG. 10 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 5 and 6 illustrate two example implementations of the processor circuitry 1212, 1312 of FIGS. 12-13, many other approaches are contemplated. For example, as mentioned above, modern FPGA circuitry may include an on-board CPU, such as one or more of the example CPU 1520 of FIG. 15. Therefore, the processor circuitry 1212, 1312 of FIGS. 12-13 may additionally be implemented by combining the example microprocessor 1400 of FIG. 14 and the example FPGA circuitry 1500 of FIG. 15. In some such hybrid examples, a first portion of the machine readable instructions represented by the flowchart of FIG. 10 may be executed by one or more of the cores 1402 of FIG. 14, a second portion of the machine readable instructions represented by the flowchart of FIG. 10 may be executed by the FPGA circuitry 1500 of FIG. 15, and/or a third portion of the machine readable instructions represented by the flowchart of FIG. 10 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1212, 1312 of FIGS. 12-13 may be in one or more packages. For example, the microprocessor 1400 of FIG. 14 and/or the FPGA circuitry 1500 of FIG. 15 may be in one or more packages. In some examples, an XPU may be implemented by the processor circuitry 1212, 1312 of FIGS. 12-13, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that provide process control instruments with local barrier circuitry in a protection compartment of the instrument to safely couple non-intrinsically safe circuitry in the protection compartment to intrinsically safe circuitry in a non-protection compartment of the instrument. As a result, the local barrier circuitry enables the instrument to be positioned local to (e.g., mechanically coupled to) an associated process control assembly. Moreover, the local barrier circuitry enables the intrinsically safe circuitry to be positioned outside of the protection compartment to improve an ease with which an operator and/or a network can interface with the intrinsically safe circuitry while ensuring that any potentially hazardous events encountered by the non-intrinsically safe circuitry are safely contained within the protection compartment. Additionally, by enabling the non-intrinsically safe circuitry to be positioned outside of the protection compartment, the local barrier circuitry can reduce a size and/or a cost associated with the process control instrument.

Process control instruments having local intrinsic safety barriers and methods of manufacturing the same are disclosed herein. Further examples and combinations thereof include the following:

Example 1 includes a field instrument for a process control assembly comprising a non-protection compartment, intrinsically safe circuitry positioned in the non-protection compartment, a protection compartment, non-intrinsically safe circuitry positioned in the protection compartment, and local barrier circuitry positioned in the protection compartment to operatively couple the non-intrinsically safe circuitry to the intrinsically safe circuitry, the local barrier circuitry to prevent the intrinsically safe circuitry from receiving an electrical energy that is greater than an electrical energy threshold from the non-intrinsically safe circuitry.

Example 2 includes the field instrument of example 1, wherein the protection compartment is mechanically coupled to the process control assembly.

Example 3 includes the field instrument of example 1, wherein the local barrier circuitry includes voltage reduction circuitry, control signal barrier circuitry, and communication signal barrier circuitry, wherein the voltage reduction circuitry relays a first signal to the control signal barrier circuitry, wherein the control signal barrier circuitry transmits the first signal to the intrinsically safe circuitry, wherein the communication signal barrier circuitry receives a second signal from the non-intrinsically safe circuitry upstream of the voltage reduction circuitry, wherein the communication signal barrier circuitry transmits the second signal to the intrinsically safe circuitry.

Example 4 includes the field instrument of example 3, wherein the voltage reduction circuitry includes a transistor, a resistor, and an operational amplifier, wherein the operational amplifier causes the second signal to pass through the transistor in response to a voltage of the second signal satisfying a voltage threshold, and wherein the operational amplifier causes the second signal to pass through the resistor in response to the voltage not satisfying the voltage threshold.

Example 5 includes the field instrument of example 3, wherein the local barrier circuitry includes a fuse to couple the voltage reduction circuitry to the control signal barrier circuitry.

Example 6 includes the field instrument of example 3, wherein the non-intrinsically safe circuitry includes electromagnetic interference filter circuitry to transmit the first signal and the second signal to the local barrier circuitry.

Example 7 includes the field instrument of example 3, wherein the first signal is to control an actuator of the process control assembly, and wherein the second signal is indicative of a status or configuration of the process control assembly.

Example 8 includes the field instrument of example 3, wherein the intrinsically safe circuitry includes current-to-pressure transducer circuitry to cause a positional adjustment of a valve of the process control assembly based on the first signal.

Example 9 includes the field instrument of example 1, wherein the intrinsically safe circuitry includes user interface circuitry, the non-protection compartment to enable an operator to interact with the user interface circuitry via touch.

Example 10 includes the field instrument of example 9, wherein the non-protection compartment is exposed to a flammable media.

Example 11 includes the field instrument of example 1, wherein the local barrier circuitry includes a first electrical coupling, a second electrical coupling, a fuse, a Zener diode, and a semiconductor controlled rectifier, wherein the fuse is to couple the first electrical coupling to the non-intrinsically safe circuitry, wherein the Zener diode includes a first terminal and a second terminal, wherein the semiconductor controlled rectifier includes a first terminal coupled to the first electrical coupling, a second terminal coupled to the second electrical coupling, and a gate terminal coupled to the second terminal of the Zener diode, wherein the Zener diode is configured to trip the semiconductor controlled rectifier in response to encountering a voltage that satisfies a first voltage threshold, wherein the semiconductor controlled rectifier is configured to trip the fuse in response being tripped.

Example 12 includes the field instrument of example 11, wherein the Zener diode is a first Zener diode, wherein the local barrier circuitry further includes a second Zener diode, wherein the second Zener diode includes a first terminal and a second terminal, wherein the first terminal of the second Zener diode is coupled to the first electrical coupling downstream of the first terminal of the first Zener diode, wherein the second terminal of the second Zener diode is coupled to the second electrical coupling, wherein the first Zener diode has a first Zener voltage and the second diode has a second Zener voltage, the second Zener voltage greater than the first Zener voltage to prevent the second Zener diode from delivering an electrical current to the second electrical coupling when the first Zener diode trips the semiconductor controlled rectifier.

Example 13 includes an apparatus comprising a process control assembly, and a field instrument positioned local to the process control assembly, the field instrument including a non-protection compartment, intrinsically safe circuitry positioned in the non-protection compartment, a protection compartment, non-intrinsically safe circuitry positioned in the protection compartment, and local barrier circuitry positioned in the protection compartment to operatively couple the non-intrinsically safe circuitry to the intrinsically safe circuitry, the local barrier circuitry to prevent the intrinsically safe circuitry from receiving an electrical energy that is greater than an electrical energy threshold from the non-intrinsically safe circuitry.

Example 14 includes the apparatus of example 13, wherein the local barrier circuitry includes voltage reduction circuitry, control signal barrier circuitry, and communication signal barrier circuitry, wherein the voltage reduction circuitry relays a first signal to the control signal barrier circuitry, wherein the control signal barrier circuitry transmits the first signal to the intrinsically safe circuitry, wherein the communication signal barrier circuitry receives a second signal from the non-intrinsically safe circuitry upstream of the voltage reduction circuitry, wherein the communication signal barrier circuitry transmits the second signal to the intrinsically safe circuitry.

Example 15 includes the apparatus of example 14, wherein the voltage reduction circuitry includes a transistor, a resistor, and an operational amplifier, wherein the operational amplifier causes the second signal to pass through the transistor in response to a voltage of the second signal satisfying a voltage threshold, and wherein the operational amplifier causes the second signal to pass through the resistor in response to the voltage not satisfying the voltage threshold.

Example 16 includes the apparatus of example 14, wherein the local barrier circuitry includes a fuse to couple the voltage reduction circuitry to the control signal barrier circuitry.

Example 17 includes the apparatus of example 14, wherein the first signal is to control an actuator of the process control assembly, and wherein the second signal is indicative of a status or configuration of the process control assembly.

Example 18 includes the apparatus of example 14, wherein the intrinsically safe circuitry includes a current-to-pressure transducer to cause a positional adjustment of a valve of the process control assembly based on the first signal.

Example 19 includes the apparatus of example 13, wherein the local barrier circuitry includes a first electrical coupling, a second electrical coupling, a fuse, a Zener diode, and a semiconductor controlled rectifier, wherein the fuse is to couple the electrical coupling to the non-intrinsically safe circuitry, wherein the Zener diode includes a first terminal and a second terminal, wherein the semiconductor controlled rectifier includes a first terminal coupled to the first electrical coupling, a second terminal coupled to the second electrical coupling, and a gate terminal coupled to the second terminal of the Zener diode, wherein the Zener diode is configured to trip the semiconductor controlled rectifier in response to encountering a voltage that satisfies a first voltage threshold, wherein the semiconductor controlled rectifier is configured to trip the fuse in response being tripped.

Example 20 includes the apparatus of example 19, wherein the Zener diode is a first Zener diode, wherein the local barrier circuitry further includes a second Zener diode, wherein the second Zener diode includes a first terminal and a second terminal, wherein the first terminal of the second Zener diode is coupled to the first electrical coupling downstream of the first terminal of the first Zener diode, wherein the second terminal of the second Zener diode is coupled to the second electrical coupling, wherein the first Zener diode has a first Zener voltage and the second diode has a second Zener voltage, the second Zener voltage greater than the first Zener voltage to prevent the second Zener diode from delivering an electrical current to the second electrical coupling when the first Zener diode trips the semiconductor controlled rectifier.

The foregoing examples of the local barrier circuitry can be used with process control assemblies to couple non-intrinsically safe circuitry to intrinsically safe circuitry. Although each example local barrier circuitry disclosed above has certain features, it should be understood that it is not necessary for a particular feature of one example local barrier circuitry to be used exclusively with that example. Instead, any of the features described above and/or depicted in the drawings can be combined with any of the examples, in addition to or in substitution for any of the other features of those examples. Features of one example are not mutually exclusive to features of another example. Instead, the scope of this disclosure encompasses any combination of any of the features of the disclosed examples.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A field instrument for a process control assembly comprising:
   a non-protection compartment;
   intrinsically safe circuitry positioned in the non-protection compartment;
   a protection compartment;
   non-intrinsically safe circuitry positioned in the protection compartment; and
   local barrier circuitry positioned in the protection compartment to operatively couple the non-intrinsically safe circuitry to the intrinsically safe circuitry, the local barrier circuitry including a first portion to prevent the intrinsically safe circuitry from receiving a first signal having a first electrical energy that is greater than an electrical energy threshold from the non-intrinsically safe circuitry, the local barrier circuitry including a second portion to prevent the intrinsically safe circuitry from receiving a second signal having a second electrical energy that is greater than a second electrical energy threshold from the non-intrinsically safe circuitry, the first portion of the local barrier circuitry distinct from the second portion.

2. The field instrument of claim 1, wherein the protection compartment is mechanically coupled to the process control assembly.

3. The field instrument of claim 1, wherein the local barrier circuitry includes voltage reduction circuitry, control signal barrier circuitry, and communication signal barrier circuitry, the voltage reduction circuitry to relay the first signal to the control signal barrier circuitry, the control signal barrier circuitry to transmit the first signal to the intrinsically safe circuitry, the communication signal barrier circuitry to receive the second signal from the non-intrinsically safe circuitry upstream of the voltage reduction circuitry, the communication signal barrier circuitry to transmit the second signal to the intrinsically safe circuitry.

4. The field instrument of claim 3, wherein the voltage reduction circuitry includes a transistor, a resistor, and an operational amplifier, wherein the operational amplifier causes the second signal to pass through the transistor in response to a voltage of the second signal satisfying a voltage threshold, and wherein the operational amplifier causes the second signal to pass through the resistor in response to the voltage not satisfying the voltage threshold.

5. The field instrument of claim 3, wherein the local barrier circuitry includes a fuse to couple the voltage reduction circuitry to the control signal barrier circuitry.

6. The field instrument of claim 1, wherein the non-intrinsically safe circuitry includes electromagnetic interference filter circuitry to transmit the first signal and the second signal to the local barrier circuitry.

7. The field instrument of claim 1, wherein the first signal is to control an actuator of the process control assembly, and wherein the second signal is indicative of a status or configuration of the process control assembly.

8. The field instrument of claim 1, wherein the intrinsically safe circuitry includes current-to-pressure transducer circuitry to cause a positional adjustment of a valve of the process control assembly based on the first signal.

9. The field instrument of claim 1, wherein the intrinsically safe circuitry includes user interface circuitry, the non-protection compartment to enable an operator to interact with the user interface circuitry via touch.

10. The field instrument of claim 9, wherein the non-protection compartment is exposed to a flammable media.

11. A field instrument for a process control assembly comprising:
a non-protection compartment;
intrinsically safe circuitry positioned in the non-protection compartment;
a protection compartment;
non-intrinsically safe circuitry positioned in the protection compartment; and
local barrier circuitry positioned in the protection compartment to operatively couple the non-intrinsically safe circuitry to the intrinsically safe circuitry, the local barrier circuitry to prevent the intrinsically safe circuitry from receiving an electrical energy that is greater than an electrical energy threshold from the non-intrinsically safe circuitry, wherein the local barrier circuitry includes a first electrical coupling, a second electrical coupling, a fuse, a Zener diode, and a semiconductor controlled rectifier, wherein the fuse is to couple the first electrical coupling to the non-intrinsically safe circuitry, wherein the Zener diode includes a first terminal and a second terminal, wherein the semiconductor controlled rectifier includes a first terminal coupled to the first electrical coupling, a second terminal coupled to the second electrical coupling, and a gate terminal coupled to the second terminal of the Zener diode, wherein the Zener diode is configured to trip the semiconductor controlled rectifier in response to encountering a voltage that satisfies a first voltage threshold, wherein the semiconductor controlled rectifier is configured to trip the fuse in response to being tripped.

12. The field instrument of claim 11, wherein the Zener diode is a first Zener diode, wherein the local barrier circuitry further includes a second Zener diode, wherein the second Zener diode includes a first terminal and a second terminal, wherein the first terminal of the second Zener diode is coupled to the first electrical coupling downstream of the first terminal of the first Zener diode, wherein the second terminal of the second Zener diode is coupled to the second electrical coupling, wherein the first Zener diode has a first Zener voltage and the second Zener diode has a second Zener voltage, the second Zener voltage greater than the first Zener voltage to prevent the second Zener diode from delivering an electrical current to the second electrical coupling when the first Zener diode trips the semiconductor controlled rectifier.

13. An apparatus comprising:
a process control assembly;
a power supply; and
a field instrument positioned local mechanically coupled directly to the process control assembly via a first coupling, the field instrument including:
a non-protection compartment;
intrinsically safe circuitry positioned in the non-protection compartment;
a protection compartment;
non-intrinsically safe circuitry positioned in the protection compartment, the non-intrinsically safe circuitry electrically coupled to the power supply via a second coupling distinct from the first coupling; and
local barrier circuitry positioned in the protection compartment to operatively couple the non-intrinsically safe circuitry to the intrinsically safe circuitry, the local barrier circuitry to prevent the intrinsically safe circuitry from receiving an electrical energy that is greater than an electrical energy threshold from the non-intrinsically safe circuitry.

14. The apparatus of claim 13, wherein the local barrier circuitry includes voltage reduction circuitry, control signal barrier circuitry, and communication signal barrier circuitry, the voltage reduction circuitry to relay a first signal to the control signal barrier circuitry, the control signal barrier circuitry to transmit the first signal to the intrinsically safe circuitry, the communication signal barrier circuitry to receive a second signal from the non-intrinsically safe circuitry upstream of the voltage reduction circuitry, the communication signal barrier circuitry to transmit the second signal to the intrinsically safe circuitry.

15. The apparatus of claim 14, wherein the voltage reduction circuitry includes a transistor, a resistor, and an operational amplifier, wherein the operational amplifier causes the second signal to pass through the transistor in response to a voltage of the second signal satisfying a voltage threshold, and wherein the operational amplifier causes the second signal to pass through the resistor in response to the voltage not satisfying the voltage threshold.

16. The apparatus of claim 14, wherein the local barrier circuitry includes a fuse to couple the voltage reduction circuitry to the control signal barrier circuitry.

17. The apparatus of claim 14, wherein the first signal is to control an actuator of the process control assembly, and wherein the second signal is indicative of a status or configuration of the process control assembly.

18. The apparatus of claim 14, wherein the intrinsically safe circuitry includes a current-to-pressure transducer to cause a positional adjustment of a valve of the process control assembly based on the first signal.

19. The apparatus of claim 13, wherein the local barrier circuitry includes a first electrical coupling, a second electrical coupling, a fuse, a Zener diode, and a semiconductor controlled rectifier, wherein the fuse is to couple the first electrical coupling to the non-intrinsically safe circuitry, wherein the Zener diode includes a first terminal and a second terminal, wherein the semiconductor controlled rectifier includes a first terminal coupled to the first electrical coupling, a second terminal coupled to the second electrical coupling, and a gate terminal coupled to the second terminal of the Zener diode, wherein the Zener diode is configured to trip the semiconductor controlled rectifier in response to encountering a voltage that satisfies a first voltage threshold, wherein the semiconductor controlled rectifier is configured to trip the fuse in response to being tripped.

20. The apparatus of claim 19, wherein the Zener diode is a first Zener diode, wherein the local barrier circuitry further includes a second Zener diode, wherein the second Zener diode includes a first terminal and a second terminal, wherein the first terminal of the second Zener diode is coupled to the first electrical coupling downstream of the first terminal of the first Zener diode, wherein the second terminal of the second Zener diode is coupled to the second electrical coupling, wherein the first Zener diode has a first Zener voltage and the second Zener diode has a second Zener voltage, the second Zener voltage greater than the first Zener voltage to prevent the second Zener diode from delivering an electrical current to the second electrical coupling when the first Zener diode trips the semiconductor controlled rectifier.

* * * * *

UNITED STATES PATENT AND TRADEMARK OFFICE
CERTIFICATE OF CORRECTION

PATENT NO. : 12,355,235 B2
APPLICATION NO. : 18/176322
DATED : July 8, 2025
INVENTOR(S) : Arnold et al.

Page 1 of 1

It is certified that error appears in the above-identified patent and that said Letters Patent is hereby corrected as shown below:

In the Claims

Column 38, (Claim 13), Line 4, Delete: "positioned local"

Signed and Sealed this
Twelfth Day of August, 2025

Coke Morgan Stewart
*Acting Director of the United States Patent and Trademark Office*